(12) United States Patent
Higginbotham et al.

(10) Patent No.: US 10,655,912 B2
(45) Date of Patent: May 19, 2020

(54) PURIFICATION OF CARBON DIOXIDE

(71) Applicant: Air Products and Chemicals, Inc., Allentown, PA (US)

(72) Inventors: Paul Higginbotham, Guildford (GB); John Eugene Palamara, Macungie, PA (US); Galip Hakan Guvelioglu, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 329 days.

(21) Appl. No.: 14/521,062

(22) Filed: Oct. 22, 2014

(65) Prior Publication Data

US 2015/0114032 A1 Apr. 30, 2015

Related U.S. Application Data

(63) Continuation of application No. PCT/US2013/066927, filed on Oct. 25, 2013, which
(Continued)

(51) Int. Cl.
*F25J 1/00* (2006.01)
*B01D 53/00* (2006.01)
(Continued)

(52) U.S. Cl.
CPC .......... *F25J 1/0027* (2013.01); *B01D 53/002* (2013.01); *C01B 17/167* (2013.01); *F25J 3/0266* (2013.01);
(Continued)

(58) Field of Classification Search
CPC .... F25J 3/0266; F25J 2200/76; F25J 2200/84; F25J 2235/02
See application file for complete search history.

(56) References Cited

U.S. PATENT DOCUMENTS 2,627,731 A 2/1953 Benedict
3,417,572 A 12/1968 Pryor
(Continued)

FOREIGN PATENT DOCUMENTS

CN 101809396 A 8/2010
DE 3515949 A1 * 12/1985 ............. C01B 31/20
(Continued)

OTHER PUBLICATIONS

English translations of DE 3515949 and DE 102007013325, provided by Espacenet. May 25, 2017.*
European Patent Office, International Search Report and Written Opinion of the International Searching Authority, dated Jun. 5, 2014, for PCT/US2013/066927.

*Primary Examiner* — John F Pettitt, III
(74) *Attorney, Agent, or Firm* — Amy Carr-Trexler

(57) ABSTRACT

Impurities that are less volatile than carbon dioxide, e.g. hydrogen sulfide, are removed from crude carbon dioxide by processes involving distillation of said crude carbon dioxide in a distillation column system operating at super-atmospheric pressure(s) to produce carbon dioxide-enriched overhead vapor and bottoms liquid enriched with said impurities. Where such processes involve a single heat pump cycle, significant savings in power consumption are realized when the distillation column system is re-boiled by at least partially vaporizing liquid in or taken from an intermediate location in the column system.

21 Claims, 22 Drawing Sheets

Related U.S. Application Data is a continuation-in-part of application No. 13/456,854, filed on Apr. 26, 2012.

(51) Int. Cl.

| | | |
|---|---|---|
| *F25J 3/08* | (2006.01) | |
| *C01B 17/16* | (2006.01) | |
| *F25J 3/02* | (2006.01) | |

(52) U.S. Cl.
CPC ............ *F25J 3/08* (2013.01); *B01D 2256/22* (2013.01); *B01D 2257/304* (2013.01); *F25J 2200/02* (2013.01); *F25J 2200/04* (2013.01); *F25J 2200/30* (2013.01); *F25J 2200/40* (2013.01); *F25J 2200/50* (2013.01); *F25J 2200/74* (2013.01); *F25J 2200/76* (2013.01); *F25J 2200/78* (2013.01); *F25J 2210/06* (2013.01); *F25J 2215/80* (2013.01); *F25J 2220/84* (2013.01); *F25J 2230/80* (2013.01); *F25J 2235/02* (2013.01); *F25J 2235/80* (2013.01); *F25J 2240/02* (2013.01); *F25J 2240/30* (2013.01); *F25J 2245/02* (2013.01); *F25J 2260/20* (2013.01); *F25J 2260/80* (2013.01); *F25J 2270/02* (2013.01); *F25J 2270/80* (2013.01); *F25J 2270/88* (2013.01); *F25J 2290/40* (2013.01); *Y02P 20/129* (2015.11); *Y02P 20/152* (2015.11)

(56) References Cited

U.S. PATENT DOCUMENTS

| | | |
|---|---|---|
| 3,643,451 A | 2/1972 | Foucar |
| 3,813,890 A | 6/1974 | Bligh |
| 4,563,202 A | 1/1986 | Yao et al. |
| 4,675,035 A | 6/1987 | Apffel |
| 4,681,612 A * | 7/1987 | O'Brien ............... B01D 53/22 62/624 |
| 7,883,569 B2 | 2/2011 | Stinson |
| 2003/0161780 A1 | 8/2003 | Howard et al. |
| 2006/0107691 A1 * | 5/2006 | Howard ............... F25J 3/0209 62/617 |
| 2009/0120780 A1 | 5/2009 | Wegerer |
| 2010/0263407 A1 * | 10/2010 | Paradowski ........... F25J 3/0209 62/621 |
| 2011/0005273 A1 | 1/2011 | Gahier et al. |
| 2013/0036765 A1 | 2/2013 | Renaud |

FOREIGN PATENT DOCUMENTS

| | | | |
|---|---|---|---|
| DE | 102007013325 A1 * | 9/2008 | ............ C01B 3/506 |
| EP | 2656898 A2 | 10/2013 | |
| WO | 8102291 A1 | 8/1981 | |
| WO | 09007938 | 1/2009 | |
| WO | 2011007752 A1 | 1/2011 | |
| WO | 11135538 | 11/2011 | |

* cited by examiner

COMPARATIVE EXAMPLE 1

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | °C | 8.6 | -35.8 | -37.7 | -31.5 | -40.9 | -37.6 | 32.0 | 54.0 | -3.8 | -0.6 | 32.0 | 49.6 |
| Pressure | Bar | 44.8 | 44.7 | 12.8 | 12.7 | 12.6 | 80.0 | 79.9 | 153.0 | 12.7 | 48.1 | 48.0 | 208.0 |
| Molar Flow | kmol/s | 1.798 | 1.798 | 1.798 | 1.798 | 1.657 | 1.657 | 1.657 | 1.657 | 0.142 | 0.142 | 0.142 | 0.142 |
| Vapor Fraction | | 0.00 | 0.00 | 0.01 | 0.99 | 0.00 | 0.00 | 0.00 | 0.00 | 0.00 | 0.00 | 0.00 | 0.00 |
| Mole fraction CO$_2$ | | 0.9140 | 0.9140 | 0.9140 | 0.9140 | 0.9873 | 0.9873 | 0.9873 | 0.9873 | 0.0578 | 0.0578 | 0.0578 | 0.0578 |
| Mole fraction H$_2$S | | 0.0740 | 0.0740 | 0.0740 | 0.0740 | 0.0000 | 0.0000 | 0.0000 | 0.0000 | 0.9380 | 0.9380 | 0.9380 | 0.9380 |
| Mole fraction Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mole fraction Propane | | 0.0018 | 0.0018 | 0.0018 | 0.0018 | 0.0018 | 0.0018 | 0.0018 | 0.0018 | 0.0016 | 0.0016 | 0.0016 | 0.0016 |
| Mole fraction Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | °C | -34.1 | -6.1 | -40.9 | -2.7 | | | 38.0 | -35.7 | -19.7 | -3.8 | | |
| Pressure | Bar | 12.6 | 12.4 | 12.6 | 12.4 | | | 32.7 | 32.6 | 12.7 | 12.7 | | |
| Molar Flow | kmol/s | 5.725 | 5.725 | 0.253 | 0.253 | | | 5.977 | 5.977 | 3.644 | 3.644 | | |
| Vapor Fraction | | 1.00 | 1.00 | 1.00 | 1.00 | | | 1.00 | 0.00 | 0.00 | 0.96 | | |
| Mole fraction CO$_2$ | | 0.9873 | 0.9873 | 0.7932 | 0.7932 | | | 0.9791 | 0.9791 | 0.2812 | 0.2812 | | |
| Mole fraction H$_2$S | | 0.0000 | 0.0000 | 0.0000 | 0.0000 | | | 0.0000 | 0.0000 | 0.7155 | 0.7155 | | |
| Mole fraction Methane | | 0.0109 | 0.0109 | 0.2052 | 0.2052 | | | 0.0191 | 0.0191 | 0.0000 | 0.0000 | | |
| Mole fraction Propane | | 0.0018 | 0.0018 | 0.0016 | 0.0016 | | | 0.0018 | 0.0018 | 0.0031 | 0.0031 | | |
| Mole fraction Methanol | | 0.0000 | 0.0000 | 0.0000 | 0.0000 | | | 0.0000 | 0.0000 | 0.0001 | 0.0001 | | |

| | | |
|---|---|---|
| CP1 | 12666 | kW |
| CP2 | 2612 | kW |
| P1 | 573 | kW |
| P2 | 1128 | kW |
| P3 | 40 | kW |
| P4 | 194 | kW |
| E1 | -160 | kW |
| Total power | 17054 | kW |

FIG. 16

EXAMPLE 1

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | °C | 8.6 | -40.7 | -43.9 | -36.5 | -48.7 | -45.6 | 29.2 | 44.8 | -11.6 | -8.4 | 29.2 | 46.6 |
| Pressure | Bar | 44.8 | 44.7 | 10.2 | 10.1 | 10.0 | 79.9 | 79.8 | 153.0 | 10.1 | 46.8 | 46.7 | 208.0 |
| Molar Flow | kmol/s | 1.798 | 1.798 | 1.798 | 1.798 | 1.657 | 1.657 | 1.657 | 1.657 | 0.142 | 0.142 | 0.142 | 0.142 |
| Vapor Fraction | | 0.00 | 0.00 | 0.02 | 1.00 | 0.00 | 0.00 | 0.00 | 0.00 | 0.00 | 0.00 | 0.00 | 0.00 |
| Mole fraction $CO_2$ | | 0.9140 | 0.9140 | 0.9140 | 0.9140 | 0.9873 | 0.9873 | 0.9873 | 0.9873 | 0.0579 | 0.0579 | 0.0579 | 0.0579 |
| Mole fraction $H_2S$ | | 0.0740 | 0.0740 | 0.0740 | 0.0740 | 0.0000 | 0.0000 | 0.0000 | 0.0000 | 0.9386 | 0.9386 | 0.9386 | 0.9386 |
| Mole fraction Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mole fraction Propane | | 0.0018 | 0.0018 | 0.0018 | 0.0018 | 0.0019 | 0.0019 | 0.0019 | 0.0019 | 0.0010 | 0.0010 | 0.0010 | 0.0010 |
| Mole fraction Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | °C | -40.5 | 5.9 | -48.7 | 6.0 | 38.0 | -42.1 | 38.0 | -42.6 | -27.4 | -11.6 | 170 | 172 |
| Pressure | bar | 10.0 | 9.8 | 10.0 | 9.8 | 16.3 | 16.1 | 27.7 | 27.6 | 10.1 | 10.1 | | |
| Molar Flow | kmol/s | 5.273 | 5.273 | 0.282 | 0.282 | 1.593 | 1.593 | 3.963 | 3.963 | 3.280 | 3.280 | | |
| Vapor Fraction | | 1.00 | 1.00 | 1.00 | 1.00 | 1.00 | 0.00 | 1.00 | 0.00 | 0.00 | 0.96 | | |
| Mole fraction $CO_2$ | | 0.9873 | 0.9873 | 0.7376 | 0.7376 | 0.9746 | 0.9746 | 0.9746 | 0.9746 | 0.2983 | 0.2983 | | |
| Mole fraction $H_2S$ | | 0.0000 | 0.0000 | 0.0000 | 0.0000 | 0.0000 | 0.0000 | 0.0000 | 0.0000 | 0.6996 | 0.6996 | | |
| Mole fraction Methane | | 0.0109 | 0.0109 | 0.2607 | 0.2607 | 0.0236 | 0.0236 | 0.0236 | 0.0236 | 0.0000 | 0.0000 | | |
| Mole fraction Propane | | 0.0019 | 0.0019 | 0.0017 | 0.0017 | 0.0019 | 0.0019 | 0.0019 | 0.0019 | 0.0019 | 0.0019 | | |
| Mole fraction Methanol | | 0.0000 | 0.0000 | 0.0000 | 0.0000 | 0.0000 | 0.0000 | 0.0000 | 0.0000 | 0.0001 | 0.0001 | | |

| | | |
|---|---|---|
| CP1 | 7759 | kW |
| CP2 | 6293 | kW |
| P1 | 580 | kW |
| P2 | 970 | kW |
| P3 | 41 | kW |
| P4 | 194 | kW |
| E1 | -166 | kW |
| Total power | 15671 | kW |

FIG. 17

EXAMPLE 2

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | °C | 8.6 | -22.2 | -26.9 | -22.2 | -30.3 | -26.8 | 29.8 | 46.1 | 7.4 | 10.3 | 29.8 | 47.2 |
| Pressure | bar | 44.8 | 44.7 | 17.2 | 17.1 | 17.0 | 80.0 | 79.9 | 153.0 | 17.1 | 47.7 | 47.6 | 208.0 |
| Molar Flow | kmol/s | 1.798 | 1.798 | 1.798 | 1.798 | 1.656 | 1.656 | 1.656 | 1.656 | 0.142 | 0.142 | 0.142 | 0.142 |
| Vapor Fraction | | 0.00 | 0.00 | 0.03 | 1.00 | 0.00 | 0.00 | 0.00 | 0.00 | 0.00 | 0.00 | 0.00 | 0.00 |
| Mole fraction CO$_2$ | | 0.9140 | 0.9140 | 0.9140 | 0.9140 | 0.9876 | 0.9876 | 0.9876 | 0.9876 | 0.0577 | 0.0577 | 0.0577 | 0.0577 |
| Mole fraction H$_2$S | | 0.0740 | 0.0740 | 0.0740 | 0.0740 | 0.0000 | 0.0000 | 0.0000 | 0.0000 | 0.9351 | 0.9351 | 0.9351 | 0.9351 |
| Mole fraction Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mole fraction Propane | | 0.0018 | 0.0018 | 0.0018 | 0.0018 | 0.0015 | 0.0015 | 0.0015 | 0.0015 | 0.0048 | 0.0048 | 0.0048 | 0.0048 |
| Mole fraction Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | °C | -25.1 | 14.9 | -30.3 | 15.2 | 38.0 | -25.0 | 38.0 | -24.6 | -6.5 | 7.4 | -21.4 | -18.9 |
| Pressure | bar | 17.0 | 16.8 | 17.0 | 16.8 | 24.6 | 24.4 | 44.9 | 44.8 | 17.1 | 17.1 | 17.1 | 17.1 |
| Molar Flow | kmol/s | 6.765 | 6.765 | 0.316 | 0.316 | 6.457 | 6.457 | 0.624 | 0.624 | 0.619 | 0.619 | 5.077 | 5.077 |
| Vapor Fraction | | 1.00 | 1.00 | 1.00 | 1.00 | 1.00 | 0.00 | 1.00 | 0.00 | 0.00 | 0.77 | 0.00 | 0.86 |
| Mole fraction CO$_2$ | | 0.9876 | 0.9876 | 0.8502 | 0.8502 | 0.9815 | 0.9815 | 0.9815 | 0.9815 | 0.2153 | 0.2153 | 0.7775 | 0.7775 |
| Mole fraction H$_2$S | | 0.0000 | 0.0000 | 0.0000 | 0.0000 | 0.0000 | 0.0000 | 0.0000 | 0.0000 | 0.7766 | 0.7766 | 0.2198 | 0.2198 |
| Mole fraction Methane | | 0.0109 | 0.0109 | 0.1484 | 0.1484 | 0.0170 | 0.0170 | 0.0170 | 0.0170 | 0.0000 | 0.0000 | 0.0002 | 0.0002 |
| Mole fraction Propane | | 0.0015 | 0.0015 | 0.0014 | 0.0014 | 0.0015 | 0.0015 | 0.0015 | 0.0015 | 0.0074 | 0.0074 | 0.0024 | 0.0024 |
| Mole fraction Methanol | | 0.0000 | 0.0000 | 0.0000 | 0.0000 | 0.0000 | 0.0000 | 0.0000 | 0.0000 | 0.0006 | 0.0006 | 0.0001 | 0.0001 |

| | | |
|---|---|---|
| CP1 | 7214 | kW |
| CP2 | 1085 | kW |
| P1 | 554 | kW |
| P2 | 985 | kW |
| P3 | 36 | kW |
| P4 | 195 | kW |
| E1 | -134 | kW |
| Total power | 9933 | kW |

FIG. 18

EXAMPLE 3

| Stream No. | | 100 | 102 | 104 | 106 | 154 | 111 | 158 | 160 | 186 | 188 | 190 | 192 |
|---|---|---|---|---|---|---|---|---|---|---|---|---|---|
| Temperature | °C | 11.1 | | | -23.3 | -24.8 | -24.8 | 10.8 | 38.0 | 7.4 | 9.5 | 29.8 | 48.2 |
| Pressure | bar | 44.8 | | | 17.1 | 17.0 | 17.0 | 16.9 | 110.0 | 17.1 | 39.2 | 39.1 | 208.0 |
| Molar Flow | kmol/s | 1.798 | | | 1.798 | 6.858 | 1.248 | 1.656 | 1.656 | 0.142 | 0.142 | 0.142 | 0.142 |
| Vapor Fraction | | 1.00 | | | 0.87 | 1.00 | 1.00 | 1.00 | 1.00 | 0.00 | 0.00 | 0.00 | 0.00 |
| Mole fraction $CO_2$ | | 0.9140 | | | 0.9140 | 0.9941 | 0.9941 | 0.9875 | 0.9875 | 0.0578 | 0.0578 | 0.0578 | 0.0578 |
| Mole fraction $H_2S$ | | 0.0740 | | | 0.0740 | 0.0000 | 0.0000 | 0.0000 | 0.0000 | 0.9354 | 0.9354 | 0.9354 | 0.9354 |
| Mole fraction Methane | | 0.0100 | | | 0.0100 | 0.0044 | 0.0044 | 0.0109 | 0.0109 | 0.0000 | 0.0000 | 0.0000 | 0.0000 |
| Mole fraction Propane | | 0.0018 | | | 0.0018 | 0.0016 | 0.0016 | 0.0016 | 0.0016 | 0.0043 | 0.0043 | 0.0043 | 0.0043 |
| Mole fraction Methanol | | 0.0002 | | | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | °C | -24.8 | 14.3 | | | 38.0 | -17.2 | 38.0 | -8.6 | -7.0 | 7.4 | -21.3 | -18.8 |
| Pressure | bar | 17.0 | 16.8 | | | 22.8 | 22.6 | 37.6 | 37.5 | 17.1 | 17.1 | 17.1 | 17.1 |
| Molar Flow | kmol/s | 5.610 | 5.610 | | | 5.035 | 5.035 | 0.576 | 0.576 | 0.799 | 0.799 | 5.062 | 5.062 |
| Vapor Fraction | | 1.00 | 1.00 | | | 1.00 | 0.00 | 1.00 | 0.00 | 0.00 | 0.82 | 0.00 | 0.87 |
| Mole fraction $CO_2$ | | 0.9941 | 0.9941 | | | 0.9941 | 0.9941 | 0.9941 | 0.9941 | 0.2266 | 0.2266 | 0.7759 | 0.7759 |
| Mole fraction $H_2S$ | | 0.0000 | 0.0000 | | | 0.0000 | 0.0000 | 0.0000 | 0.0000 | 0.7661 | 0.7661 | 0.2214 | 0.2214 |
| Mole fraction Methane | | 0.0044 | 0.0044 | | | 0.0044 | 0.0044 | 0.0044 | 0.0044 | 0.0000 | 0.0000 | 0.0002 | 0.0002 |
| Mole fraction Propane | | 0.0016 | 0.0016 | | | 0.0016 | 0.0016 | 0.0016 | 0.0016 | 0.0069 | 0.0069 | 0.0025 | 0.0025 |
| Mole fraction Methanol | | 0.0000 | 0.0000 | | | 0.0000 | 0.0000 | 0.0000 | 0.0000 | 0.0005 | 0.0005 | 0.0000 | 0.0000 |

| | | |
|---|---|---|
| CP1 | 4541 | kW |
| CP2 | 833 | kW |
| CP3 | 10190 | kW |
| P2 | 565 | kW |
| P3 | 26 | kW |
| P4 | 206 | kW |
| E1 | -2027 | kW |
| Total power | 14334 | kW |

FIG. 19

Comparative Example 2

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | C | 8.7 | -21.3 | -26.7 | -22.4 | -29.9 | -26.3 | 31.9 | 53.1 | 8.8 | 11.8 | 11.9 | 27.8 |
| Pressure | bar | 44.8 | 44.7 | 17.2 | 17.1 | 17.0 | 80.0 | 79.9 | 153.0 | 17.1 | 47.5 | 47.4 | 208.0 |
| Molar Flow | kmol/s | 1.798 | 1.798 | 1.798 | 1.798 | 1.654 | 1.654 | 1.654 | 1.654 | 0.145 | 0.145 | 0.145 | 0.145 |
| Vapor Fraction | | 0.00 | 0.00 | 0.04 | 1.00 | 0.00 | 0.00 | 1.00 | 0.00 | 0.00 | 0.00 | 0.00 | 0.00 |
| Mol. Frac. CO$_2$ | | 0.9140 | 0.9140 | 0.9140 | 0.9140 | 0.9891 | 0.9891 | 0.9891 | 0.9891 | 0.0567 | 0.0567 | 0.0567 | 0.0567 |
| Mol. Frac. H$_2$S | | 0.0740 | 0.0740 | 0.0740 | 0.0740 | 0.0000 | 0.0000 | 0.0000 | 0.0000 | 0.9189 | 0.9189 | 0.9189 | 0.9189 |
| Mol. Frac. Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mol. Frac. Propane | | 0.0018 | 0.0018 | 0.0018 | 0.0018 | 0.0000 | 0.0000 | 0.0000 | 0.0000 | 0.0219 | 0.0219 | 0.0219 | 0.0219 |
| Mol. Frac. Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | C | -25.1 | -17.3 | -29.9 | 22.7 | | | 38.0 | -24.8 | -6.6 | 8.8 | | |
| Pressure | bar | 17.0 | 16.8 | 17.0 | 16.8 | | | 52.4 | 52.3 | 17.1 | 17.1 | | |
| Molar Flow | kmol/s | 8.135 | 8.135 | 0.345 | 0.345 | | | 8.479 | 8.479 | 5.787 | 5.787 | | |
| Vapor Fraction | | 1.00 | 1.00 | 1.00 | 1.00 | | | 1.00 | 0.00 | 0.00 | 0.97 | | |
| Mol. Frac. CO$_2$ | | 0.9891 | 0.9891 | 0.8629 | 0.8629 | | | 0.9839 | 0.9839 | 0.2230 | 0.2230 | | |
| Mol. Frac. H$_2$S | | 0.0000 | 0.0000 | 0.0000 | 0.0000 | | | 0.0000 | 0.0000 | 0.7511 | 0.7511 | | |
| Mol. Frac. Methane | | 0.0109 | 0.0109 | 0.1371 | 0.1371 | | | 0.0160 | 0.0160 | 0.0000 | 0.0000 | | |
| Mol. Frac. Propane | | 0.0000 | 0.0000 | 0.0000 | 0.0000 | | | 0.0000 | 0.0000 | 0.0257 | 0.0257 | | |
| Mol. Frac. Methanol | | 0.0000 | 0.0000 | 0.0000 | 0.0000 | | | 0.0000 | 0.0000 | 0.0002 | 0.0002 | | |

| | | |
|---|---|---|
| CP1 | 17219 | kW |
| CP2 | 5866 | kW |
| P1 | 552 | kW |
| P2 | 1104 | kW |
| P3 | 36 | kW |
| P4 | 189 | kW |
| E1 | -130 | kW |
| Total power | 24835 | kW |

FIG. 20

Example 4

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | C | 8.7 | -10.2 | -25.4 | -22.4 | -29.9 | -26.3 | 30.0 | 46.5 | 8.8 | 12.0 | 30.0 | 47.7 |
| Pressure | bar | 44.8 | 44.7 | 17.2 | 17.1 | 17.0 | 80.0 | 79.9 | 153.0 | 17.1 | 49.4 | 49.3 | 208.0 |
| Molar Flow | kmol/s | 1.798 | 1.798 | 1.798 | 1.798 | 1.654 | 1.654 | 1.654 | 1.654 | 0.145 | 0.145 | 0.145 | 0.145 |
| Vapor Fraction | | 0.00 | 0.00 | 0.11 | 1.00 | 0.00 | 0.00 | 1.00 | 0.00 | 0.00 | 0.00 | 0.00 | 0.00 |
| Mol. Frac. CO$_2$ | | 0.9140 | 0.9140 | 0.9140 | 0.9140 | 0.9891 | 0.9891 | 0.9891 | 0.9891 | 0.0567 | 0.0567 | 0.0567 | 0.0567 |
| Mol. Frac. H$_2$S | | 0.0740 | 0.0740 | 0.0740 | 0.0740 | 0.0000 | 0.0000 | 0.0000 | 0.0000 | 0.9191 | 0.9191 | 0.9191 | 0.9191 |
| Mol. Frac. Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mol. Frac. Propane | | 0.0018 | 0.0018 | 0.0018 | 0.0018 | 0.0000 | 0.0000 | 0.0000 | 0.0000 | 0.0218 | 0.0218 | 0.0218 | 0.0218 |
| Mol. Frac. Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | C | -25.1 | 10.5 | -29.9 | 7.2 | | | 38.0 | -22.3 | -3.2 | 8.8 | -21.1 | -17.5 |
| Pressure | bar | 17.0 | 16.8 | 17.0 | 16.8 | | | 33.5 | 33.4 | 17.1 | 17.1 | 17.1 | 17.1 |
| Molar Flow | kmol/s | 8.372 | 8.372 | 0.551 | 0.551 | | | 8.922 | 8.922 | 0.449 | 0.449 | 6.740 | 6.740 |
| Vapor Fraction | | 1.00 | 1.00 | 1.00 | 1.00 | | | 1.00 | 0.00 | 0.00 | 0.68 | 0.00 | 0.93 |
| Mol. Frac. CO$_2$ | | 0.9891 | 0.9891 | 0.8629 | 0.8629 | | | 0.9813 | 0.9813 | 0.1723 | 0.1723 | 0.7397 | 0.7397 |
| Mol. Frac. H$_2$S | | 0.0000 | 0.0000 | 0.0000 | 0.0000 | | | 0.0000 | 0.0000 | 0.8024 | 0.8024 | 0.2511 | 0.2511 |
| Mol. Frac. Methane | | 0.0109 | 0.0109 | 0.1371 | 0.1371 | | | 0.0187 | 0.0187 | 0.0000 | 0.0000 | 0.0002 | 0.0002 |
| Mol. Frac. Propane | | 0.0000 | 0.0000 | 0.0000 | 0.0000 | | | 0.0000 | 0.0000 | 0.0244 | 0.0244 | 0.0090 | 0.0090 |
| Mol. Frac. Methanol | | 0.0000 | 0.0000 | 0.0000 | 0.0000 | | | 0.0000 | 0.0000 | 0.0009 | 0.0009 | 0.0001 | 0.0001 |

| | | |
|---|---|---|
| CP1 | 13018 | kW |
| CP2 | 3420 | kW |
| P1 | 552 | kW |
| P2 | 986 | kW |
| P3 | 38 | kW |
| P4 | 195 | kW |
| E1 | -97 | kW |
| Total power | 18111 | kW |

FIG. 21

Example 5

| Stream No. | | 100 | 102 | 104 | 106 | 154 | 156 | 158 | 160 | 186 | 188 | 190 | 192 |
|---|---|---|---|---|---|---|---|---|---|---|---|---|---|
| Temperature | C | 8.7 | -6.5 | -25.2 | -22.4 | -29.9 | -26.3 | 30.4 | 47.5 | 8.8 | 11.9 | 30.4 | 48.1 |
| Pressure | bar | 44.8 | 44.7 | 17.2 | 17.1 | 17.0 | 80.0 | 79.9 | 153.0 | 17.1 | 49.1 | 49.0 | 208.0 |
| Molar Flow | kmol/s | 1.798 | 1.798 | 1.798 | 1.798 | 1.654 | 1.654 | 1.654 | 1.654 | 0.145 | 0.145 | 0.145 | 0.145 |
| Vapor Fraction | | 0.00 | 0.00 | 0.14 | 1.00 | 0.00 | 0.00 | 1.00 | 0.00 | 0.00 | 0.00 | 0.00 | 0.00 |
| Mol. Frac. CO$_2$ | | 0.9140 | 0.9140 | 0.9140 | 0.9140 | 0.9891 | 0.9891 | 0.9891 | 0.9891 | 0.0567 | 0.0567 | 0.0567 | 0.0567 |
| Mol. Frac. H$_2$S | | 0.0740 | 0.0740 | 0.0740 | 0.0740 | 0.0000 | 0.0000 | 0.0000 | 0.0000 | 0.9190 | 0.9190 | 0.9190 | 0.9190 |
| Mol. Frac. Methane | | 0.0100 | 0.0100 | 0.0100 | 0.0100 | 0.0109 | 0.0109 | 0.0109 | 0.0109 | 0.0000 | 0.0000 | 0.0000 | 0.0000 |
| Mol. Frac. Propane | | 0.0018 | 0.0018 | 0.0018 | 0.0018 | 0.0000 | 0.0000 | 0.0000 | 0.0000 | 0.0218 | 0.0218 | 0.0218 | 0.0218 |
| Mol. Frac. Methanol | | 0.0002 | 0.0002 | 0.0002 | 0.0002 | 0.0000 | 0.0000 | 0.0000 | 0.0000 | 0.0025 | 0.0025 | 0.0025 | 0.0025 |

| Stream No. | | 110 | 112 | 140 | 142 | 120 | 122 | 130 | 132 | 180 | 182 | 170 | 172 |
|---|---|---|---|---|---|---|---|---|---|---|---|---|---|
| Temperature | C | -25.1 | 12.4 | -29.9 | 9.1 | 38.0 | -22.2 | 38.0 | -25.8 | -4.3 | 8.8 | -21.8 | -19.3 |
| Pressure | bar | 17.0 | 16.8 | 17.0 | 16.8 | 29.1 | 28.9 | 54.8 | 54.7 | 17.1 | 17.1 | 17.1 | 17.1 |
| Molar Flow | kmol/s | 8.351 | 8.351 | 0.538 | 0.538 | 8.250 | 8.250 | 0.639 | 0.639 | 0.616 | 0.616 | 6.764 | 6.764 |
| Vapor Fraction | | 1.00 | 1.00 | 1.00 | 1.00 | 1.00 | 0.00 | 1.00 | 0.00 | 0.00 | 0.77 | 0.00 | 0.90 |
| Mol. Frac. CO$_2$ | | 0.9891 | 0.9891 | 0.8629 | 0.8629 | 0.9814 | 0.9814 | 0.9814 | 0.9814 | 0.1872 | 0.1872 | 0.7826 | 0.7826 |
| Mol. Frac. H$_2$S | | 0.0000 | 0.0000 | 0.0000 | 0.0000 | 0.0000 | 0.0000 | 0.0000 | 0.0000 | 0.7873 | 0.7873 | 0.2101 | 0.2101 |
| Mol. Frac. Methane | | 0.0109 | 0.0109 | 0.1371 | 0.1371 | 0.0185 | 0.0185 | 0.0185 | 0.0185 | 0.0000 | 0.0000 | 0.0002 | 0.0002 |
| Mol. Frac. Propane | | 0.0000 | 0.0000 | 0.0000 | 0.0000 | 0.0000 | 0.0000 | 0.0000 | 0.0000 | 0.0248 | 0.0248 | 0.0071 | 0.0071 |
| Mol. Frac. Methanol | | 0.0000 | 0.0000 | 0.0000 | 0.0000 | 0.0000 | 0.0000 | 0.0000 | 0.0000 | 0.0007 | 0.0007 | 0.0001 | 0.0001 |

| CP1 | 13108 | kW |
|---|---|---|
| CP2 | 1139 | kW |
| P1 | 552 | kW |
| P2 | 1001 | kW |
| P3 | 38 | kW |
| P4 | 196 | kW |
| E1 | -83 | kW |
| Total power | 15950 | kW |

FIG. 22

PURIFICATION OF CARBON DIOXIDE

CROSS-REFERENCE TO RELATED APPLICATIONS

This application claims the benefit of PCT/US13/66927 filed on Oct. 25, 2013 and is a continuation-in-part of U.S. application Ser. No. 13/456,854 filed on Apr. 26, 2012, which is incorporated by reference herein in its entirety.

BACKGROUND

The present invention relates to processes and apparatus for the purification of carbon dioxide. In particular, the invention relates to the removal of impurities that are less volatile than carbon dioxide from crude carbon dioxide comprising at least one such impurity by distillation at sub-ambient temperatures and super-atmospheric pressures. The invention has particular application to the removal of hydrogen sulfide from carbon dioxide.

Carbon dioxide from naturally occurring carbon dioxide sources, such as natural carbon dioxide fields and natural gas deposits, is used for enhanced oil recovery (EOR) in some areas of the world. Some of these sources contain hydrogen sulfide, which is undesirable for pipeline transport since hydrogen sulfide is toxic and corrosive in the presence of water. In addition, it is not desirable to introduce hydrogen sulfide to the crude oil that is being extracted by the EOR process.

Processes for the removal of hydrogen sulfide from carbon dioxide are known. For example, U.S. Pat. No. 3,417,572A (Pryor, 1968) discloses a method of treating hydrogen-rich gas comprising carbon dioxide and hydrogen sulfide. The hydrogen sulfide and carbon dioxide are condensed and separated from the hydrogen-rich gas. The condensed gases are then fed to a distillation column for separation into an essentially hydrogen sulfide-free carbon dioxide overhead vapor and a bottoms liquid containing at least 10 vol. % hydrogen sulfide. The separated hydrogen-rich gas is scrubbed to remove any residual carbon dioxide and hydrogen sulfide which is then also fed to the distillation column. Overhead vapor is condensed using an external closed cycle of propane refrigerant and bottoms liquid is re-boiled using process cooling water. The distillation column has 100 trays and operates at about 590 psia (~41 bar) so that the overhead temperature is 42° F. (~6° C.) and the bottom temperature is about 45° F. (~7° C.).

U.S. Pat. No. 3,643,451A (Foucar, 1972) discloses a method of producing high purity, high pressure carbon dioxide from a concentrated low pressure mixture of acid gases. The gaseous mixture is compressed, cooled and condensed and fed to a distillation column where it is separated into a high purity (at least 99.95%) carbon dioxide overhead vapor and a bottoms liquid containing condensed sulfur-containing gases. The overhead vapor is condensed using an external closed cycle of ammonia refrigerant and refrigeration duty for cooling and condensing the feed is provided by vaporizing bottoms liquid, carbon dioxide overhead liquid and the external refrigerant. The distillation column system operates at about 300 to 350 psia (~21 to 24 bar) so that the overhead temperature is −5 to −10° F. (~−21 to −24° C.) and the bottoms temperature is 40 to 70° F. (~5 to 21° C.). A bottoms product of 97% hydrogen sulfide is produced in the example.

WO81/02291A (Schuftan, 1981) discloses a method for separating a gas mixture comprising carbon dioxide, at least one gas having a lower boiling point than carbon dioxide and at least one impurity (typically hydrogen sulfide) having a higher boiling point than carbon dioxide. The gas mixture is cooled and distilled in a first column to a product gas free of the impurity and a liquid fraction containing the impurity. Pure carbon dioxide is obtained in a second distillation column, which operates slightly above the triple point pressure (~518 kPa) of carbon dioxide. Liquid product from the first column is flashed at an intermediate pressure to remove dissolved light impurities, then further reduced in pressure and evaporated before being fed to the second column as vapor. The carbon dioxide overhead vapor is practically free of impurities and the bottoms liquid fraction is rich in impurities, typically containing sulfur compounds (primarily hydrogen sulfide) at a purity of up to 50 vol. %. Reflux and re-boil are effected by a heat pump cycle which uses purified carbon dioxide as the working fluid. The working fluid is passed through a compressor, a heat exchanger and a re-boiler immersed in the bottoms liquid, where it is condensed before being fed back to the top of the column as reflux. A substantially pure carbon dioxide product is withdrawn from the circulating carbon dioxide immediately upstream of the compressor at a pressure of about 5 atm. and at near ambient temperature.

SUMMARY

It is an objective of preferred embodiments of the present invention to reduce the energy consumed in distillation processes for the removal of less volatile impurities such as hydrogen sulfide from crude carbon dioxide, that involve a heat pump cycle to provide re-boil duty.

According to a first aspect of the present invention, there is provided a process for purifying crude carbon dioxide comprising at least one impurity that is less volatile than carbon dioxide, said process comprising feeding crude carbon dioxide feed at sub-ambient temperature to a distillation column system operating at super-atmospheric pressure(s) for separation to produce carbon dioxide-enriched overhead vapor and bottoms liquid enriched with said at least one impurity; providing carbon dioxide-enriched liquid as reflux for the distillation column system; at least partially re-boiling a portion of the bottoms liquid by indirect heat exchange to provide vapor for the distillation column system; removing carbon dioxide-enriched overhead vapor from the distillation column system; and removing a further portion of the bottoms liquid, or a liquid derived from bottoms liquid, from the distillation column system. Re-boiling duty for the distillation column system is provided at least in part by indirect heat exchange against recycle fluids from at least one heat pump cycle using a carbon dioxide-containing fluid from the distillation column system as working fluid. At least one of the recycle fluids has a different pressure from the other recycle fluid(s).

In preferred embodiments, liquid from an intermediate location in the distillation column is at least partially re-boiled by indirect heat exchange, preferably against at least one of said recycle fluids, to provide additional vapor for said distillation column.

The first aspect of the present invention embraces a process comprising feeding crude carbon dioxide feed at sub-ambient temperature to a distillation column system operating at super-atmospheric pressure(s) for separation to produce carbon dioxide-enriched overhead vapor and bottoms liquid enriched with said at least one impurity; removing the carbon dioxide-enriched overhead vapor from the distillation column system and warming at least a portion of the carbon dioxide-enriched overhead vapor by indirect heat exchange to produce warmed carbon dioxide-enriched gas; compressing a first working fluid comprising the warmed carbon dioxide-enriched gas to produce at least one compressed carbon dioxide-enriched gas; cooling and at least partially condensing at least a portion of the compressed carbon dioxide-enriched gas as a first recycle fluid by indirect heat exchange to produce carbon dioxide-enriched fluid; expanding the carbon dioxide-enriched fluid to produce expanded carbon dioxide-enriched fluid and feeding the expanded carbon dioxide-enriched fluid to said distillation column system, at least a portion of which being used as reflux; compressing a second working fluid comprising carbon dioxide-rich gas from said distillation column system to produce at least one second recycle fluid; cooling and optionally condensing at least a portion of the second recycle fluid by indirect heat exchange to produce cooled carbon dioxide-rich fluid; after expansion as required, feeding at least a portion of the cooled carbon dioxide-rich fluid to the distillation column system; at least partially re-boiling a portion of the bottoms liquid by indirect heat exchange to produce vapor for the distillation column system; and removing a further portion of the bottoms liquid, or a liquid derived from bottoms liquid, from the distillation column system. Re-boiling duty for the distillation column system is provided at least in part by indirect heat exchange against the first and second recycle fluids, the first recycle fluid having a different pressure from the second recycle fluid.

In some preferred embodiments, the compressed carbon dioxide-enriched gas is divided into at least a first portion and a second portion, wherein the first portion is the first recycle fluid(s), and wherein the second portion is the carbon dioxide-rich gas for compression to produce the second recycle fluid(s).

In other preferred embodiments, carbon dioxide-rich vapor is removed from an intermediate location in the distillation column system and warmed by indirect heat exchange to produce the carbon dioxide-rich gas for compression to produce the second recycle fluid(s).

Preferably, liquid from an intermediate location in said distillation column system is at least partially re-boiled by indirect heat exchange to provide additional vapor for said distillation column system.

The first aspect of the present invention also embraces a process comprising feeding crude carbon dioxide feed at sub-ambient temperature in a distillation column system operating at super-atmospheric pressure(s) for separation to produce carbon dioxide-enriched overhead vapor and bottoms liquid enriched with said at least one impurity; condensing a portion of the carbon dioxide-enriched overhead vapor by indirect heat exchange to provide reflux for the distillation column system; removing a further portion of the carbon dioxide-enriched overhead vapor from said distillation system; removing carbon dioxide-rich liquid from an intermediate location in the distillation column system and expanding the liquid to produce expanded carbon dioxide-rich liquid; warming and evaporating the expanded carbon dioxide-rich liquid by indirect heat exchange to provide warmed carbon dioxide-rich gas; compressing a working fluid comprising the warmed carbon dioxide-rich gas to produce at least one compressed carbon dioxide-rich gas as a first recycle fluid and at least one further compressed carbon dioxide-rich gas as a second recycle fluid; cooling and optionally at least partially condensing the first recycle fluid by indirect heat exchange to produce cooled first carbon dioxide-rich fluid; combining the cooled first carbon dioxide-rich fluid with crude carbon dioxide fluid to produce the crude carbon dioxide feed for the distillation column system; cooling and at least partially condensing the second recycle fluid by indirect heat exchange to produce cooled second carbon dioxide-rich fluid; expanding the cooled second carbon dioxide-rich fluid to produce expanded carbon dioxide-rich fluid; combining the expanded carbon dioxide-rich fluid with a fluid selected from the group consisting of the carbon dioxide-rich liquid, the expanded carbon dioxide-rich liquid, and the warmed carbon dioxide-rich gas; at least partially re-boiling a portion of the bottoms liquid by indirect heat exchange to produce vapor for the distillation column system; and removing a further portion of the bottoms liquid, or a liquid derived from bottoms liquid, from the distillation column system. Re-boiling duty is provided at least in part by indirect heat exchange against the first and second recycle fluids. In addition, in embodiments in which the expanded carbon dioxide-rich fluid is combined with the warmed carbon dioxide-rich gas, the expanded carbon dioxide-rich fluid is first warmed and evaporated by indirect heat exchange, for example against overhead vapor, to produce further warmed carbon dioxide-rich gas for the combination with the warmed carbon dioxide-rich gas.

In an alternative arrangement of the first aspect of the present invention, there is provided a process for purifying crude carbon dioxide comprising at least one impurity that is less volatile than carbon dioxide, said process comprising:

feeding crude carbon dioxide to a distillation column system operating at super-atmospheric pressure(s) for separation to produce carbon dioxide-enriched overhead vapor and bottoms liquid enriched with said at least one impurity;

providing carbon dioxide-enriched liquid as reflux for said distillation column system;

re-boiling said distillation column system by at least partially vaporizing the impurity-enriched bottoms liquid and at least one intermediate liquid in or taken from an intermediate location in said distillation column system by indirect heat exchange to provide vapor for said distillation column system;

removing the carbon dioxide-enriched overhead vapor from said distillation column system; and removing the impurity-enriched bottoms liquid, or a liquid derived from the impurity-enriched bottoms liquid, from said distillation column system, wherein said process comprises a heat pump cycle using as working fluid carbon dioxide-containing fluid from said distillation column system; and wherein said intermediate liquid or, where there is more than one intermediate liquid, at least one and typically all of said intermediate liquids, is/are at least partially vaporized by said indirect heat exchange against carbon dioxide-enriched overhead vapor from said distillation column system, thereby at least partially condensing said carbon dioxide-enriched overhead vapor.

Processes according to the present invention may be integrated with an up-stream separation, in which a crude carbon dioxide stream containing hydrogen sulfide as an impurity is produced. Suitable up-stream separations are disclosed in U.S. Pat. No. 7,883,569 (and related patents) and WO81/02291A.

According to a second aspect of the present invention there is provided apparatus for carrying out a process of the first aspect. The apparatus comprises a distillation column system for operation at super-atmospheric pressure(s) for separating crude carbon dioxide feed at sub-ambient temperature to produce carbon-dioxide-enriched vapor and bottoms liquid enriched with said at least one impurity; a first heat exchanger arrangement for warming at least a portion of the carbon dioxide-enriched overhead vapor by indirect heat exchange to produce warmed carbon dioxide-enriched gas; a conduit arrangement for removing carbon dioxide-enriched overhead vapor from the distillation column system and feeding the vapor to the first heat exchanger arrangement; a first compressor system for compressing the warmed carbon dioxide-enriched gas to produce at least one compressed carbon dioxide-enriched gas; a second heat exchanger arrangement for cooling and at least partially condensing at least a portion of the compressed carbon dioxide-enriched gas as a first recycle fluid by indirect heat exchange to produce carbon dioxide-enriched fluid; a first expansion device for expanding the carbon dioxide-enriched fluid to produce expanded carbon dioxide-enriched fluid for feeding to the distillation column system as reflux; a second compressor system for compressing a carbon dioxide-rich gas from said distillation column system to produce at least one second recycle fluid; a third heat exchanger arrangement for cooling and optionally condensing at least a portion of the second recycle fluid by indirect heat exchange to produce cooled carbon dioxide-rich fluid for feeding to the distillation column system; an optional expansion device for expanding the cooled carbon dioxide-rich fluid to produce expanded carbon dioxide-rich fluid prior to being fed to the distillation column system; a fourth heat exchanger arrangement for at least partially re-boiling the bottoms liquid by indirect heat exchange against at least one of the recycle streams to produce vapor for the distillation column system; and a conduit arrangement for removing a further portion of the bottoms liquid, or a liquid derived from bottoms liquid, from the distillation column system. The first and second compressor systems are capable of compressing the warmed carbon dioxide-enriched gas and the carbon dioxide-rich gas respectively to different pressures.

In some preferred embodiments, the apparatus comprises a conduit arrangement for feeding compressed carbon dioxide enriched-gas from the first compressor system as feed to the second compressor system.

In other preferred embodiments, the apparatus comprises a fifth heat exchanger arrangement for warming a carbon dioxide-rich vapor by indirect heat exchange to produce warmed carbon dioxide-rich gas; a conduit arrangement for feeding carbon dioxide-rich vapor from an intermediate location in said distillation column system to the fifth heat exchanger arrangement; and a conduit arrangement for feeding warmed carbon dioxide-rich gas from the fifth heat exchanger arrangement to the second compressor system.

Preferably, the apparatus comprises a sixth heat exchanger arrangement for at least partially re-boiling liquid from an intermediate location in the distillation column system to provide additional vapor for the distillation column system.

Also according to the second aspect of the present invention, there is provided apparatus comprising a distillation column system for operation at super-atmospheric pressure(s) for separating crude carbon dioxide feed at sub-ambient temperature to produce carbon-dioxide-enriched vapor and bottoms liquid enriched with said at least one impurity; a first heat exchanger arrangement for cooling a partially condensing carbon dioxide-enriched overhead vapor by indirect heat exchange to produce at least partially condensed carbon dioxide-enriched overhead vapor as reflux for said distillation column system; a conduit arrangement for removing carbon dioxide-enriched overhead vapor from the distillation column system; a first expansion device for expanding carbon dioxide-rich liquid to produce expanded carbon dioxide-rich liquid; a conduit arrangement for feeding carbon dioxide-rich liquid from an intermediate location in said distillation column system to the first expansion device; a second heat exchange arrangement for warming and evaporating the expanded carbon dioxide-rich liquid by indirect heat exchange to provide warmed carbon dioxide-rich gas; a compressor system for compressing a working fluid comprising warmed carbon dioxide-rich gas to produce compressed carbon dioxide-rich gas as a first recycle fluid and at least one further compressed carbon dioxide-rich gas as a second recycle fluid; a third heat exchange system for cooling and optionally at least partially condensing the first recycle fluid by indirect heat exchange to produce cooled first carbon dioxide-rich fluid; a conduit arrangement for combining the cooled first carbon dioxide-rich fluid with crude carbon dioxide fluid to produce the crude carbon dioxide feed for the distillation column system; a fourth heat exchange arrangement for cooling the second recycle fluid by indirect heat exchange to produce cooled second carbon dioxide-rich fluid; a second expansion device for expanding the cooled second carbon dioxide-rich fluid to produce expanded carbon dioxide-rich fluid; a conduit arrangement for combining the expanded carbon dioxide-rich fluid with a fluid selected from the group consisting of the carbon dioxide-rich liquid, the expanded carbon dioxide-rich liquid, and the warmed carbon dioxide-rich gas; a fifth heat exchanger arrangement for at least partially re-boiling a portion of the bottoms liquid by indirect heat exchange against at least one of the recycle streams to produce vapor for the distillation column system; and a conduit arrangement for removing a further portion of the bottoms liquid, or a liquid derived from bottoms liquid, from the distillation column system. In embodiments in which the expanded carbon dioxide-rich fluid is combined with the warmed carbon dioxide-rich gas, the apparatus comprises sixth heat exchanger arrangement for warming expanded carbon dioxide-rich fluid by indirect heat exchange to produce further warmed carbon dioxide-rich gas for the combination with the warmed carbon dioxide-rich gas.

In preferred embodiments, the apparatus comprising a seventh heat exchanger arrangement for at least partially re-boiling liquid from an intermediate location in the distillation column system to provide additional vapor for the distillation column system.

In a first alternative arrangement of the second aspect, there is provided an apparatus comprising:

a distillation column system for operation at super-atmospheric pressure(s) for separating a crude carbon dioxide feed to produce carbon-dioxide-enriched overhead vapor and bottoms liquid enriched with said at least one impurity;

a first heat exchanger arrangement in fluid flow communication with said distillation column system for warming at least a portion of said carbon dioxide-enriched overhead vapor by indirect heat exchange to produce warmed carbon dioxide-enriched gas;

a compressor system in fluid flow communication with said first heat exchanger arrangement for compressing said warmed carbon dioxide-enriched gas to produce at least one compressed carbon dioxide-enriched recycle gas;

a second heat exchanger arrangement in fluid flow communication with said compressor system for cooling and at least partially condensing at least a portion of said compressed carbon dioxide-enriched recycle gas by indirect heat exchange to produce carbon dioxide-enriched liquid and vapor for the distillation column system;

a first expansion device in fluid flow communication with said second heat exchanger arrangement for expanding said carbon dioxide-enriched liquid to produce expanded carbon dioxide-enriched liquid;

a conduit arrangement for feeding expanded carbon dioxide-enriched liquid as reflux to said distillation column system; and a third heat exchanger arrangement for re-boiling said impurity-enriched bottoms liquid by indirect heat exchange to produce vapor for said distillation column system.

In a second alternative arrangement of the second aspect of the present invention, there is provided apparatus comprising:

a distillation column system for operation at super-atmospheric pressure(s) for separating crude carbon dioxide feed to produce carbon-dioxide-enriched overhead vapor and bottoms liquid enriched with said at least one impurity;

a first expansion device in fluid flow communication with said distillation column system for expanding an intermediate liquid from said distillation column system to produce expanded intermediate liquid a first heat exchanger arrangement in fluid flow communication with said first expansion device for vaporizing at least a portion of said expanded intermediate liquid by indirect heat exchange against carbon dioxide-enriched overhead vapor in or taken from said distillation column system to produce expanded intermediate gas and condensed carbon dioxide-enriched liquid;

a compressor system in fluid flow communication with said first distillation column system for compressing said expanded intermediate gas to produce compressed intermediate recycle gas;

a second heat exchanger arrangement in fluid flow communication with said compressor system for cooling said compressed intermediate recycle gas by indirect heat exchange to produce cooled intermediate recycle gas; and a conduit arrangement for feeding said cooled intermediate recycle gas as supplementary feed to said distillation column system.

In the second alternative arrangement, the first heat exchanger arrangement is preferably outside said distillation column system and the apparatus comprises:

a conduit arrangement for feeding carbon dioxide-enriched overhead vapor from said distillation column system to said first heat exchanger arrangement; and a conduit system for feeding condensed carbon dioxide-enriched overhead vapor from said first heat exchanger arrangement as reflux to said distillation column system.

Additionally or alternatively, the apparatus of the second alternative arrangement comprises a further heat exchanger arrangement in fluid flow communication with said first heat exchanger arrangement for warming said expanded intermediate gas by indirect heat exchange prior to said compression.

The heat exchanger arrangements are preferably passages within a single main heat exchanger, although other arrangements involving a network of heat exchangers in series or in parallel to achieve an equivalent overall effect are envisaged.

One advantage of preferred embodiments of the present invention is that overall power consumption is reduced to a significant extent which results in an associated reduction in capital and operating costs.

In addition, the use of an intermediate re-boiler has the effect of reducing the diameter the of the distillation column system provided below the reboiler due to a significant increase in concentration of the impurity and therefore an associated significant reduction in bottoms liquid inventory within the column. The reductions in column diameter provides a further saving in capital cost and enables the use of apparatus having a smaller footprint which may be critical in situations where space is at a premium.

BRIEF DESCRIPTION OF THE DRAWING(S)

Figure 14:
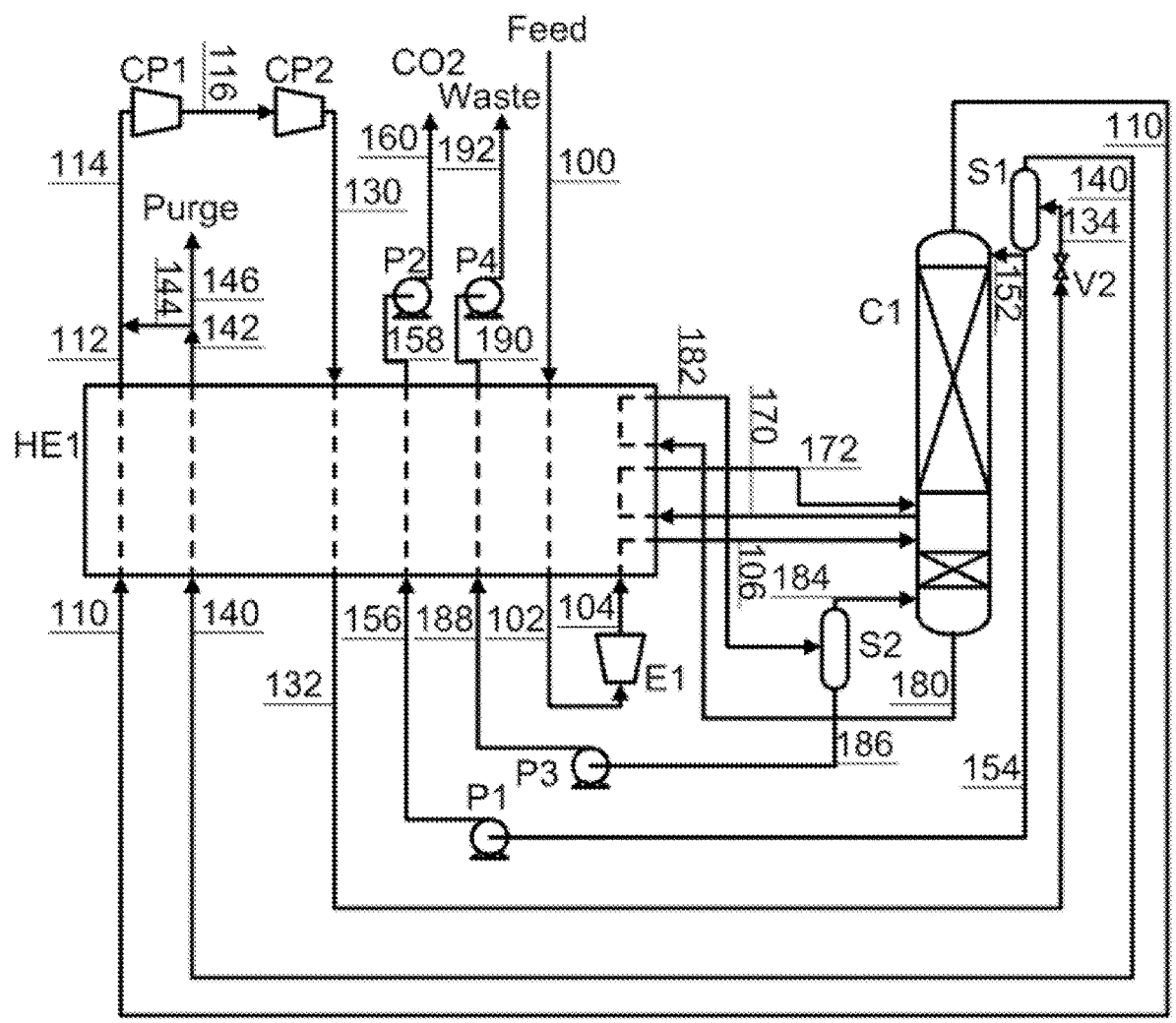
Figure 15:
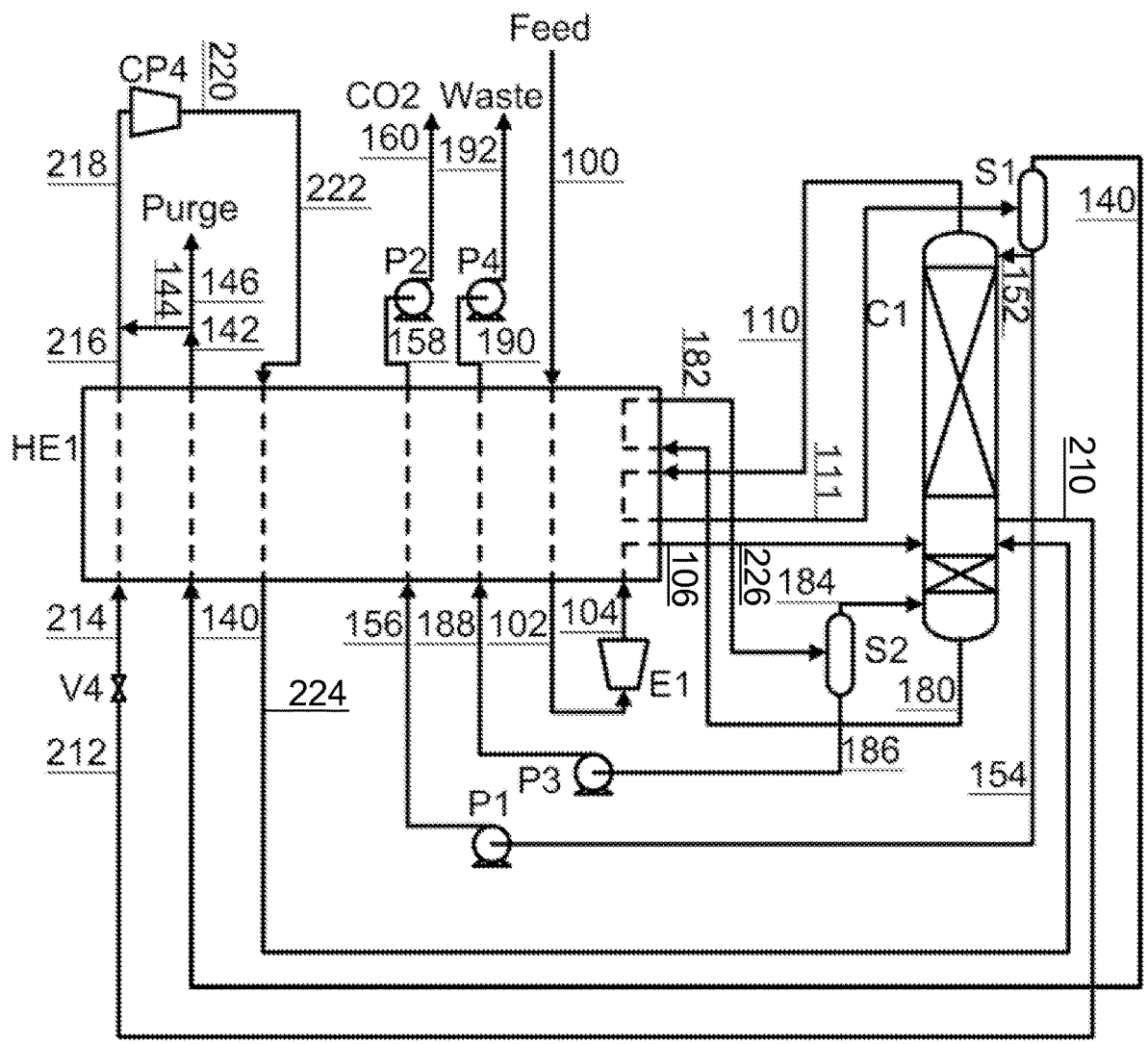

FIG. 14 is a flow sheet depicting an embodiment of the alternative arrangement of the first aspect of the present invention comprising a single heat pump cycle using carbon dioxide-enriched overhead vapor as a working fluid and an intermediate reboiler for the distillation column system; and FIG. 15 is a flow sheet depicting another embodiment of the alternative arrangement of the first aspect comprising a single heat pump cycle using intermediate liquid from the distillation column system as working fluid and condensing overhead vapor from the column system to provide reflux.

FIG. 16 shows heat and mass balance data for streams in accordance with Comparative Example 1.

FIG. 17 shows heat and mass balance data for streams in accordance with Example 1.

FIG. 18 shows heat and mass balance data for streams in accordance with Example 2.

FIG. 19 shows heat and mass balance data for streams in accordance with Example 3.

FIG. 20 shows heat and mass balance data for streams in accordance with Comparative Example 2.

FIG. 21 shows heat and mass balance data for streams in accordance with Example 4.

FIG. 22 shows heat and mass balance data for streams in accordance with Example 5.

DETAILED DESCRIPTION OF THE PREFERRED EMBODIMENT(S)

The present invention involves a process for purifying crude carbon dioxide comprising at least one impurity that is less volatile than carbon dioxide.

The crude carbon dioxide typically comprises at least 50 mol. %, e.g. at least 65 mol. % and preferably at least 80 mol. % carbon dioxide. The crude carbon dioxide typically comprises no more than 99 mol. %, e.g. no more than 95 mol. %, carbon dioxide. In preferred embodiments, the crude carbon dioxide comprises from about 85 mol. % to about 95 mol. % carbon dioxide.

Typical impurities that are less volatile than carbon dioxide include hydrogen sulfide, propane and methanol. However, the present invention has particular application in the removal of hydrogen sulfide from crude carbon dioxide. The total concentration of the less volatile impurities in the crude carbon dioxide is typically significantly less than 50 mol. %, e.g. less than 20 mol % and usually less than 10 mol. %.

The crude carbon dioxide feed may contain impurities that are more volatile than carbon dioxide. Such impurities would include methane and non-condensable gases such as nitrogen. These impurities tend to concentrate in the carbon dioxide product of the present process, which may be further processed to remove these impurities.

In its broadest aspect, the process comprises feeding crude carbon dioxide feed at sub-ambient temperature to a distillation column system operating at super-atmospheric pressure(s) for separation to produce carbon dioxide-enriched overhead vapor and bottoms liquid enriched with said at least one impurity.

By "sub-ambient temperature", the Inventors mean that the temperature is below normal ambient temperature, which is typically from about −10° C. to about 40° C. depending on the time of year and the geographical location of the plant. The temperature of the feed is typically below 0° C., e.g. no more than −10° C. and preferably below −20° C. The temperature of the feed is typically no lower than −55° C., e.g. no lower than −40° C.

By "super-atmospheric pressure", the Inventors mean that the pressure is above atmospheric pressure, which is typically about 1 bar. Typically, the operating pressure(s) of the distillation column system is above the triple point pressure of carbon dioxide, which is about 5.2 bar, and preferably, the operating pressure(s) of the distillation column system is at least 10 bar. Typically, the operating pressure(s) must be below the critical pressure of carbon dioxide (73.9 bar) and is preferably no more than 40 bar, e.g. no more than 30 bar. In preferred embodiments, the operating pressure(s) is from about 10 bar to about 25 bar.

The preferred lower limit of 10 bar for the operating pressure(s) ensures that the distillation column system does not need to operate at a temperature that is too cold and light impurities such as methane tend to be more soluble in the overhead liquid. The preferred upper limit of 25 bar means that the distillation column system operates sufficiently far from the critical pressure for the hydraulic parameters within the column to be comfortable.

All references herein to pressure are references to absolute pressure and not gauge pressure unless expressly stated otherwise.

The distillation column system may comprise a single column, a split column where both parts of the column operate at the same pressure, or multiple columns where the columns operate at different pressures. In the latter case, all of the operating pressures fall within the preferred ranges given above.

The distillation column system may also comprise at least one vapor/liquid separator to separate a vapor component from reflux liquid for the column system, and/or to separate a liquid component from vapor for the column system generated from partially re-boiled liquid taken from the column system.

The carbon dioxide-enriched overhead vapor has a greater concentration of carbon dioxide than the crude carbon dioxide feed. The concentration of carbon dioxide in the overhead vapor is typically at least 90 mol. %, e.g. at least 95 mol. % and preferably at least 98 mol. %. The overhead vapor is preferably substantially pure carbon dioxide containing zero, or essentially zero, i.e. no more than 200 ppm and preferably no more than 100 ppm, of any less volatile impurity.

The bottoms liquid comprises at least substantially all, and preferably all, of any less volatile impurity present in the crude carbon dioxide feed. In preferred embodiments, the vapor flow in the bottom section of the distillation column system is reduced resulting in a reduction in the diameter of the bottom section of the column system. The total inventory of bottoms liquid is thereby reduced significantly where there is a higher concentration of the volatile impurities. A reduction in the amount of liquid inventory means that there is less liquid inventory to escape in the event of a catastrophic failure of the plant. This advantage is particularly important where the less volatile impurity or, where there is more than one, at least one of the less volatile impurities is toxic, for example, in cases where the impurity is hydrogen sulfide.

The process also provides carbon dioxide-enriched liquid for use as reflux for the distillation column system, and a portion of the bottoms liquid is at least partially re-boiled by indirect heat exchange to provide vapor for the distillation column system. Carbon dioxide-enriched overhead vapor is removed from the distillation column system, as is a further portion of the bottoms liquid, or a liquid derived from bottoms liquid.

Re-boiling duty for the distillation column system is provided at least in part by indirect heat exchange against the or at least one recycle fluid from at least one heat pump cycle using a carbon dioxide-containing fluid from the distillation column system as working fluid. Where there are two or more recycle fluids, at least one of the recycle fluids has a different pressure from the other recycle fluid(s).

By "heat pump cycle", the Inventors are referring to a cycle by which thermal energy is transferred from a heat source, which is at lower temperature, to a heat sink, which is at higher temperature. The heat pump cycle uses a working fluid which in this case is a carbon dioxide-containing fluid from the distillation column system. Typically, the working fluid is removed from the distillation column system, warmed, compressed and recycled to the distillation column system after suitable cooling and pressure reduction. The compressed fluid, or recycle fluid, is used to provide re-boil duty by indirect heat exchange with liquid(s) taken from the distillation column system. The recycle fluid(s) are cooled to a certain extent as a result of providing the re-boil duty but typically require further cooling before being returned to the distillation column system.

In preferred embodiments, the heat source is the overhead vapor that would condense at a lower temperature that the re-boiler (the heat sink). However, the Inventors have observed that, by compressing the overhead vapor in the heat pump cycle, the vapor transfers heat to the re-boiler and is condensed at a higher temperature than the reboiler.

The working fluid is typically selected from the group consisting of carbon dioxide enriched overhead fluid or crude carbon dioxide fluid taken from an intermediate location in the distillation column system.

The first aspect of the present invention involves at least two recycle fluids at different pressures. The pressure differential is significant, typically of the order of at least 10%, e.g. at least 25% or even at least 50%, although the pressure differential is usually no more than 200%, e.g. no more than 100%. In absolute terms, the pressure differential may be at least 2 bar, e.g. at least 5 bar and preferably at least 10 bar. The pressure differential is usually no more than 50 bar and preferably no more than 30 bar.

In some preferred embodiments, the process comprises a single heat pump cycle comprising a least a first recycle fluid and a second recycle fluid, the second recycle fluid having a pressure that is greater than that of the first recycle fluid.

The pressure of the first recycle fluid is typically from about 15 bar to about 30 bar.

The pressure of the second recycle fluid is typically about 20 bar to about 70 bar.

In some embodiments, the working fluid comprises carbon dioxide-enriched gas generated by warming the carbon dioxide-enriched overhead vapor by indirect heat exchange. At least a portion of the duty required to warm the carbon dioxide-enriched overhead vapor may be provided by indirect heat exchange against any suitable "warm" process stream but is preferably provided by indirect heat exchange against the or at least one of the recycle fluids. In preferred embodiments, the compressor feed is warmed against the compressor products so that the flows on both sides of the heat exchanger are the same. In these embodiments, both the first and second recycle fluids are used to warm the overhead vapor.

The recycle fluid(s) are typically recycled to an appropriate location in the distillation column system after suitable pressure reduction. The appropriate location in the distillation column system is typically where the composition in the column matches the composition of the recycle fluids. Where the working fluid is carbon dioxide-enriched fluid, condensed recycle fluid is typically recycled as reflux to the distillation column system.

The ratio of molar flow of the first recycle fluid to the second recycle fluid is determined by the duty required of the fluids. Typically, the molar flow ratio is from about 0.1 (i.e. 1:10) to about 15 (i.e. 15:1). In some preferred embodiments, this ratio is from about 3 (i.e. 3:1) to about 12 (i.e. 12:1). In other preferred embodiments, the ratio is from about 0.2 (i.e. 1:5) to about 1 (i.e. 1:1).

In other embodiments, the working fluid comprises crude carbon dioxide gas generated by evaporating "intermediate" liquid in or taken from an intermediate location in said distillation column system by indirect heat exchange after suitable pressure reduction. The "intermediate" liquid is a crude carbon dioxide stream. In preferred embodiments, the intermediate liquid is removed from a location that is at least substantially level with the location of the main feed to the column system. In such embodiments, the composition of the intermediate liquid is usually at least substantially identical to that of the crude carbon dioxide feed. In these embodiments, the working fluid may also comprise carbon dioxide-enriched gas generated by warming the carbon dioxide-enriched overhead vapor by indirect heat exchange.

At least a portion of the duty required to evaporate said "intermediate" liquid may also be provided by any suitable "warm" process stream. Preferably, the intermediate liquid is evaporated by indirect heat exchange against condensing overhead vapor from the distillation column system.

In these other embodiments, the first recycle fluid is preferably recycled as part of the feed to the distillation column system and, additionally or alternatively, the second recycle fluid is preferably recycled as part of the working fluid for the heat pump cycle after suitable pressure reduction.

The process may comprise at least a first heat pump cycle and a second heat pump cycle, each heat pump cycle comprising at least one recycle fluid. In these embodiments, the recycle fluid of the first heat pump cycle or, where the first heat pump cycle has more than one recycle fluid, at least one of the recycle fluids, has a pressure that is greater than that of a recycle fluid of the second heat pump cycle.

The working fluid of the first heat pump cycle preferably comprises carbon dioxide-enriched gas generated by warming the carbon dioxide-enriched overhead vapor by indirect heat exchange. At least a portion of the duty required to warm the carbon dioxide-enriched overhead vapor may be provided by indirect heat exchange against any suitable "warm" process stream although, in preferred embodiments, it is provided by indirect heat exchange against at least one of the recycle fluids. The pressure of the recycle fluid of the first heat pump cycle is typically from about 15 bar to about 60 bar.

The working fluid of the second heat pump cycle preferably comprises crude carbon dioxide gas generated by warming "intermediate" vapor taken from an intermediate location of the distillation column system by indirect heat exchange. The "intermediate" vapor is a crude carbon dioxide fluid. In preferred embodiments, the intermediate vapor is removed from a location that is at least substantially level with the location of the main feed to the column system. In such embodiments, the composition of the intermediate vapor is usually at least substantially identical to that of the crude carbon dioxide feed.

At least a portion of the duty required to warm said "intermediate" vapor may be provided by indirect heat exchange against any suitable "warm" process stream although, in preferred embodiments, it is provided by indirect heat exchange against at least one of the recycle fluids.

As in the other embodiments, the recycle streams are usually recycled to appropriate locations in the distillation column system after suitable pressure reduction if required. In this connection, the first recycle fluid is preferably condensed and recycled after pressure reduction to the top of the distillation column system to provide reflux. The second recycle fluid is usually recycled after suitable pressure reduction if required to an intermediate location in the column system that is at least substantially level with the location of the main feed to the column system. In preferred embodiments in which the distillation column system comprises a dual column arrangement, the working fluid for the second heat pump cycle is intermediate overhead vapor from the lower pressure column and is recycled without pressure reduction to the bottom of the higher pressure column.

The pressure of the recycle fluid of the second heat pump cycle is preferably from about 10 bar to about 25 bar, e.g. the operating pressure of the part of the distillation column system to which the recycle fluid is recycled.

Liquid in or taken from an intermediate location in the distillation column system is at least partially re-boiled by indirect heat exchange to provide additional vapor for the distillation column system. At least a portion of the re-boiling duty may be provided by indirect heat exchange against any suitable "warm" process stream although, in preferred embodiments, it is provided by indirect heat exchange against the or at least one of the recycle fluids, e.g. the first recycle fluid which is at least partially condensed as a result.

The advantage of an intermediate re-boiler is that the power consumption is significantly reduced by only needing to compress a fraction (typically <10%) of the overhead vapor to the higher pressure required to heat the bottom re-boiler, whilst the rest only needs to be compressed to the lower pressure. A further advantage of the intermediate re-boiler is that the column diameter below it, where the hydrogen sulfide concentration increases rapidly, can be significantly reduced so that the inventory of highly toxic hydrogen sulfide can be reduced.

A portion of the working fluid may be purged from the process to prevent the buildup of more volatile impurities, e.g. methane and non-condensable gases such as nitrogen.

In some preferred embodiments, the reflux for the distillation column system is preferably provided by at least one recycle fluid condensate, typically condensed overhead vapor, after suitable pressure reduction. In other embodiments, the reflux for the column is provided by an overhead condenser arrangement in which overhead vapor is at least partially condensed by indirect heat exchange against at least one "cold" process stream, e.g. re-boiling bottoms liquid, and returned to the column system. The refrigeration duty required to cool and at least partially condense at least one recycle fluid may be provided by indirect heat exchange against any suitable "cold" process stream.

By "refrigeration duty", the Inventors mean the cooling duty and, if applicable, the condensing duty required by the process.

By "cold process stream", the Inventors mean any fluid stream within the process whose temperature is lower than that of the fluid to be cooled and, where appropriate, condensed and whose pressure is suitable to provide the necessary indirect heat exchange. Suitable "cold" process streams include streams entering a main heat exchange at the cold end. In preferred embodiments, the duty is provided by indirect heat exchange against at least one fluid selected from the group consisting of carbon dioxide-enriched liquid; bottoms liquid; liquid derived from bottoms liquid; and expanded crude carbon dioxide fluid.

The crude carbon dioxide feed is preferably crude carbon dioxide fluid derived from a natural source of carbon dioxide and expanded prior to feeding to the distillation column system. Prior to expansion, the crude carbon dioxide fluid is usually at a super-critical pressure and a sub-critical temperature.

By "super-critical pressure", the Inventors mean a pressure that is greater than the critical pressure of carbon dioxide, i.e. 73.9 bar. The pressure of the crude carbon dioxide fluid may be from about 100 bar to about 200 bar.

By "sub-critical temperature", the Inventors mean a temperature below the critical temperature of carbon dioxide, i.e. 31.1° C. The temperature of the crude carbon dioxide fluid is typically no more than 30° C., e.g. no more than 20° C. and preferably no more than 15° C. The temperature is usually no less than −20° C., e.g. no less than −10° C. and preferably no less than 0° C. In some embodiments, the temperature is about the "bubble point" of carbon dioxide, i.e. the temperature at which the carbon dioxide begins to boil at a given pressure. In other embodiments, the temperature is at or above the dew point of carbon dioxide.

The crude carbon dioxide fluid may be cooled by indirect heat exchange prior to expansion. At least a portion of the refrigeration duty required to cool the crude carbon dioxide fluid may be provided by indirect heat exchange with any suitable refrigerant stream although, in preferred embodiments, it is provided by indirect heat exchange against at least one "cold" process stream selected from the group consisting of carbon dioxide-enriched liquid; bottoms liquid; liquid derived from bottoms liquid; and expanded crude carbon dioxide fluid.

The expanded crude carbon dioxide is preferably used as a "cold" process stream to provide refrigeration duty for the process. Alternatively, the expanded crude carbon dioxide fluid may be fed directly to the distillation column stream without providing refrigeration duty by indirect heat exchange.

The feed is typically derived from supercritical crude carbon dioxide liquid and carbon dioxide-enriched liquid is produced as a product. In these embodiments, the carbon dioxide-enriched liquid is typically removed from the distillation column system, pumped and warmed by indirect heat exchange to produce warmed carbon dioxide-enriched liquid as a product. At least a portion of the duty required to warm the pumped carbon dioxide-enriched liquid may be provided by indirect heat exchange against any suitable "warm" process stream although, in preferred embodiments, it is provided by indirect heat exchange against at least one of the recycle fluids.

The pumped carbon dioxide-enriched liquid is preferably used as a "cold" process stream to provide refrigeration duty for the process.

The feed may be derived from crude carbon dioxide vapor and carbon dioxide-enriched gas is produced as a product. In these embodiments, a portion of the carbon dioxide-enriched vapor is typically warmed by indirect heat exchange to produce the carbon dioxide-enriched gas. At least a portion of the duty required to warm said carbon dioxide-enriched overhead vapor may be provided by indirect heat exchange with any suitable "warm" process stream although, in preferred embodiments, it is provided by indirect heat exchange against at least one of the recycle fluids.

The carbon dioxide-enriched overhead vapor is preferably used as a "cold" process stream to provide refrigeration duty for the process.

The further portion of bottoms liquid, or the liquid derived from bottoms liquid, is usually pumped and warmed by indirect heat exchange to provide impurity-rich waste liquid. At least a portion of the duty required to warm the pumped bottoms liquid may be provided by indirect heat exchange against any "warm" process stream although, in preferred embodiments, it is provided by indirect heat exchange against at least one of the recycle fluids.

The further portion of the bottoms liquid, or the liquid derived from bottoms liquid, is typically used as a "cold" process stream to provide refrigeration duty for the process.

An external refrigeration cycle may be used to provide at least a portion of the refrigeration duty required by the process. However, in preferred embodiments, the process is auto-refrigerated, i.e. none of the refrigeration duty is provided by an external refrigeration cycle.

Particularly preferred embodiments of the process comprise:

feeding crude carbon dioxide feed at sub-ambient temperature to a distillation column system operating at super-atmospheric pressure(s) for separation to produce carbon dioxide-enriched overhead vapor and bottoms liquid enriched with said at least one impurity;

removing said carbon dioxide-enriched overhead vapor from said distillation column system and warming at least a portion of said carbon dioxide-enriched overhead vapor by indirect heat exchange to produce warmed carbon dioxide-enriched gas;

compressing a first working fluid comprising said warmed carbon dioxide-enriched gas to produce at least one compressed carbon dioxide-enriched gas;

cooling and at least partially condensing at least a portion of said compressed carbon dioxide-enriched gas as a first recycle fluid by indirect heat exchange to produce carbon dioxide-enriched fluid;

expanding said carbon dioxide-enriched fluid to produce expanded carbon dioxide-enriched fluid and feeding said expanded carbon dioxide-enriched fluid to said distillation column system, at least a portion of which being used as reflux;

compressing a second working fluid comprising carbon dioxide-rich gas from said distillation column system to produce at least one second recycle fluid;

cooling and optionally condensing at least a portion of said second recycle fluid by indirect heat exchange to produce cooled carbon dioxide-rich fluid;

after expansion as required, feeding at least a portion of said cooled carbon dioxide-rich fluid to said distillation column system;

at least partially re-boiling a portion of said bottoms liquid by indirect heat exchange to produce vapor for said distillation column system; and removing a further portion of said bottoms liquid, or a liquid derived from bottoms liquid, from said distillation column system, wherein re-boiling duty for said distillation column system is provided at least in part by indirect heat exchange against said first and second recycle fluids, said first recycle fluid having a different pressure from said second recycle fluid.

In these embodiments, the compressed carbon dioxide-enriched gas may be divided into at least a first portion and a second portion, wherein the first portion is the first recycle fluid(s), and wherein the second portion is the carbon dioxide-rich gas for compression to produce the second recycle fluid(s).

Alternatively, carbon dioxide-rich vapor may be removed from an intermediate location in the distillation column system and warmed by indirect heat exchange to produce the carbon dioxide-rich gas for compression to produce the second recycle fluid(s).

Preferably, liquid from an intermediate location in the distillation column system is at least partially re-boiled by indirect heat exchange to provide additional vapor for the distillation column system.

In other particularly preferred embodiments, the process comprises:

feeding crude carbon dioxide feed at sub-ambient temperature to a distillation column system operating at super-atmospheric pressure(s) for separation to produce carbon dioxide-enriched overhead vapor and bottoms liquid enriched with said at least one impurity;

condensing a portion of said carbon dioxide-enriched overhead vapor by indirect heat exchange to provide reflux for said distillation column system;

removing a further portion of said carbon dioxide-enriched overhead vapor from said distillation system;

removing carbon dioxide-rich liquid from an intermediate location in said distillation column system and expanding said liquid to produce expanded carbon dioxide-rich liquid;

warming and evaporating said expanded carbon dioxide-rich liquid by indirect heat exchange to provide warmed carbon dioxide-rich gas;

compressing a working fluid comprising said warmed carbon dioxide-rich gas to produce at least one compressed carbon dioxide-rich gas as a first recycle fluid and at least one further compressed carbon dioxide-rich gas as a second recycle fluid;

cooling and optionally at least partially condensing said first recycle fluid by indirect heat exchange to produce cooled first carbon dioxide-rich fluid;

combining said cooled first carbon dioxide-rich fluid with crude carbon dioxide fluid to produce said crude carbon dioxide feed for the distillation column system;

cooling and at least partially condensing said second recycle fluid by indirect heat exchange to produce cooled second carbon dioxide-rich fluid;

expanding said cooled second carbon dioxide-rich fluid to produce expanded carbon dioxide-rich fluid;

combining said expanded carbon dioxide-rich fluid with a fluid selected from the group consisting of said carbon dioxide-rich liquid, said expanded carbon dioxide-rich liquid, and said warmed carbon dioxide-rich gas;

at least partially re-boiling a portion of said bottoms liquid by indirect heat exchange against at least one "warm" process stream to produce vapor for said distillation column system; and removing a further portion of said bottoms liquid, or a liquid derived from bottoms liquid, from said distillation column system, wherein said re-boiling duty is provided at least in part by indirect heat exchange against said first and second recycle fluids and wherein, in embodiments in which said expanded carbon dioxide-rich fluid is combined with said warmed carbon dioxide-rich gas, said expanded carbon dioxide-rich fluid is first warmed and evaporated by indirect heat exchange to produce further warmed carbon dioxide-rich gas for said combination with said warmed carbon dioxide-rich gas.

In an alternative arrangement of the first aspect of the present invention, there is provided a process for purifying crude carbon dioxide comprising at least one impurity that is less volatile than carbon dioxide, said process comprising:

feeding crude carbon dioxide to a distillation column system operating at super-atmospheric pressure(s) for separation to produce carbon dioxide-enriched overhead vapor and bottoms liquid enriched with said at least one impurity;

providing carbon dioxide-enriched liquid as reflux for said distillation column system;

re-boiling said distillation column system by at least partially vaporizing the impurity-enriched bottoms liquid and at least one intermediate liquid in or taken from an intermediate location in said distillation column system by indirect heat exchange to provide vapor for said distillation column system;

removing the carbon dioxide-enriched overhead vapor from said distillation column system; and removing the impurity-enriched bottoms liquid, or a liquid derived from the impurity-enriched bottoms liquid, from said distillation column system, wherein said process comprises a heat pump cycle using as working fluid carbon dioxide-containing fluid from said distillation column system; and wherein said intermediate liquid, or at least one of said intermediate liquids, is at least partially vaporized by said indirect heat exchange against carbon dioxide-enriched overhead vapor from said distillation column system, thereby at least partially condensing said carbon dioxide-enriched overhead vapor.

The intermediate liquid(s) may have a composition that is at least substantially identical to said crude carbon dioxide. However, in preferred embodiments, the or at least one intermediate liquid is at or taken from a location in the distillation column system below the feed location of the crude carbon dioxide and hence the or each intermediate liquid is enriched in the or each less volatile impurity In preferred embodiments of the alternative arrangement of the first aspect, the heat pump cycle has a single recycle pressure. In these embodiments, the heat pump cycle may still have two or more recycle streams although the pressure of each recycle stream would be the same. However, in particularly preferred embodiments, there is a single heat pump cycle having a single recycle stream at a particular recycle pressure. In such embodiments, significant savings in power consumption can be realized when the distillation column system is re-boiled by at least partially vaporizing liquid in or taken from an intermediate location in the column system.

The heat pump cycle typically comprises:

after optionally at least partially vaporizing said carbon dioxide-containing working fluid from said distillation column system by indirect heat exchange, warming said carbon dioxide-containing working fluid by indirect heat exchange to produce warmed carbon dioxide-containing gas;

compressing said warmed carbon dioxide-containing gas to form compressed carbon dioxide-containing recycle gas;

cooling and optionally at least partially condensing said compressed carbon dioxide-containing recycle gas by indirect heat exchange to produce cooled carbon dioxide-containing recycle fluid; and recycling at least a portion of said cooled carbon dioxide-containing recycle fluid to said distillation column system, wherein said working fluid is expanded as required either prior to said optional vaporization and warming to produce said warmed carbon dioxide-containing gas, or after said cooling and optional at least partial condensation to produce said cooled carbon-dioxide containing recycle fluid prior to recycling said cooled carbon dioxide-containing recycle fluid to said distillation column system.

The compressed carbon dioxide-containing gas is typically at a pressure from about 15 bar to about 60 bar.

At least a part of the duty required to cool and optionally at least partially condense said compressed carbon dioxide-containing recycle gas is usually provided by at least one "cold" process stream. In these embodiments, the "cold" process stream is preferably an intermediate liquid from said distillation column system.

The carbon dioxide-containing working fluid may be said carbon dioxide-enriched overhead vapor from said distillation column system. In these embodiments, the working fluid is typically at least partially condensed when cooled by said indirect heat exchange after said compression to produce at least partially condensed carbon dioxide-enriched recycle fluid for recycling after expansion as said reflux to said distillation column system.

In embodiments where the working fluid is carbon dioxide-enriched overhead vapor, said heat pump cycle typically comprises:

warming said carbon dioxide-enriched overhead vapor by indirect heat exchange to produce warmed carbon dioxide-enriched gas;

compressing said carbon dioxide-enriched gas to produce compressed carbon dioxide-enriched recycle gas;

using said compressed carbon dioxide-enriched recycle gas to provide at least a part of the reboil duty required to vaporize said intermediate liquid(s) thereby cooling and condensing said compressed carbon dioxide-enriched recycle gas to produce carbon dioxide-enriched liquid;

expanding said carbon dioxide-enriched liquid to produce expanded carbon dioxide-enriched liquid; and using at least a portion of said expanded carbon dioxide-enriched liquid to provide said reflux to said distillation column system.

In other embodiments, the carbon dioxide-containing working fluid is said intermediate liquid from said distillation column system. In these embodiments, the condensed carbon dioxide-enriched overhead vapor is typically said carbon dioxide-enriched liquid providing said reflux to said distillation column system.

In these embodiments, the working fluid may be expanded prior to said vaporization and warming to produce intermediate gas for said compression. At least a part of the duty required to vaporize said intermediate liquid is typically provided by said carbon dioxide-enriched overhead vapor.

In embodiments where the working fluid is an intermediate liquid from said distillation column system, said heat pump cycle typically comprises:

expanding said intermediate liquid to produce expanded intermediate liquid;

vaporizing said expanded intermediate liquid by indirect heat exchange against said carbon dioxide-enriched overhead vapor to produce intermediate gas and condensed carbon dioxide-enriched overhead vapor;

compressing said intermediate gas to produce compressed intermediate recycle gas;

cooling said compressed intermediate recycle gas by indirect heat exchange to produce cooled intermediate recycle gas; and feeding said cooled intermediate recycle gas to said distillation column system, wherein said condensed carbon dioxide-enriched overhead vapor is used at least in part as said carbon dioxide-enriched liquid providing said reflux to said distillation column system.

In these embodiments, the intermediate gas is preferably warmed by indirect heat exchange to produce warmed intermediate gas prior to compression.

All features described in connection with any aspect of the invention can be used with any other aspect of the invention.

The invention will now be further described with reference to the comparative process depicted in FIG. 1 and preferred embodiments of the present invention depicted in FIGS. 2 to 13.

Figure 1:
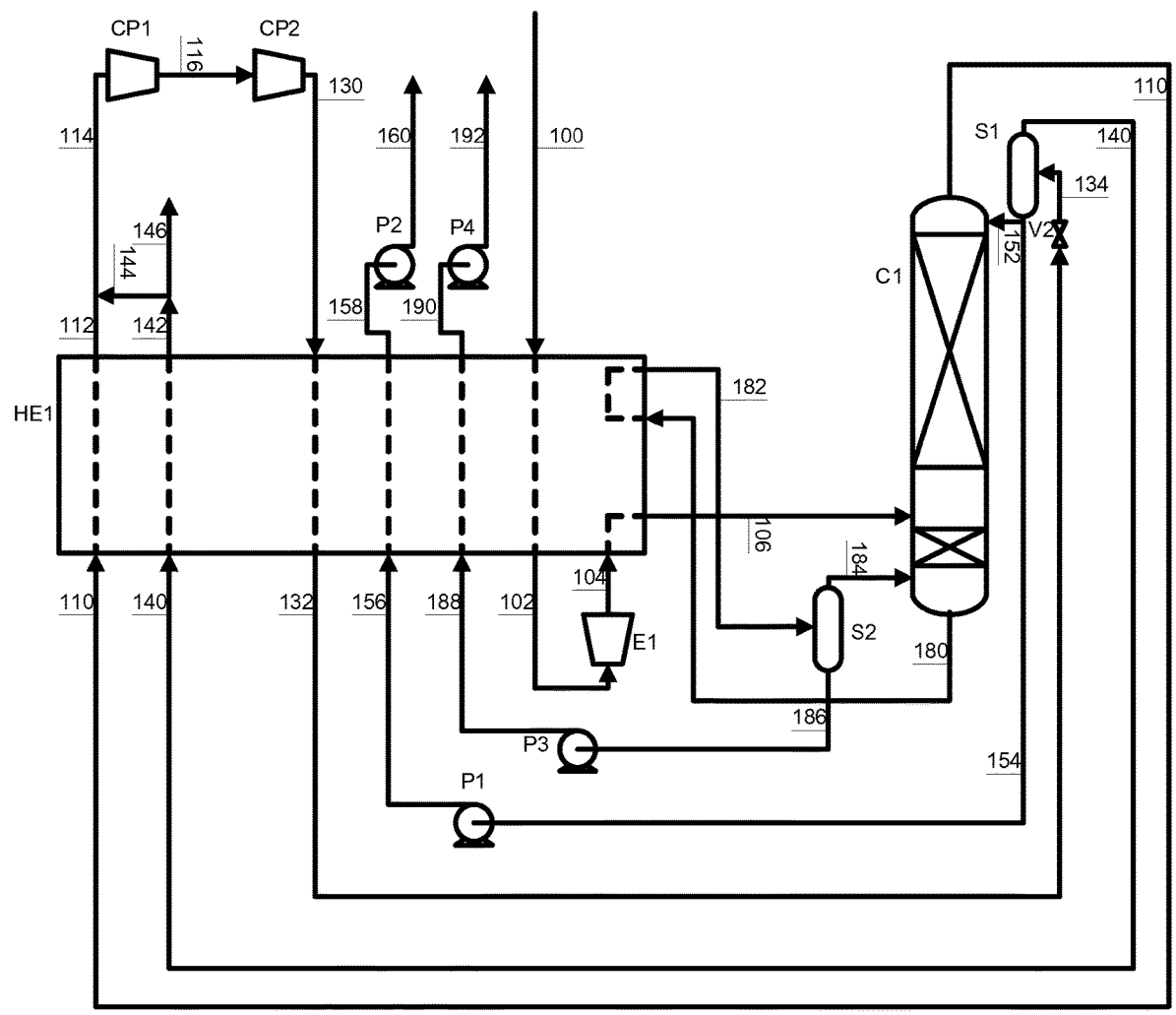
FIG. 1 is a flow sheet depicting a process for purifying crude carbon dioxide comprising a single heat pump cycle involving carbon dioxide-enriched overhead vapor as a working fluid and operating at a single recycle pressure.

FIG. 1 depicts a comparative process involving a heat pump cycle having a single recycle fluid. The feed to the process is a liquid containing about 91 mol. % carbon dioxide and about 7 mol. % hydrogen sulfide with the rest being made up of methane, propane and methanol. The liquid has a pressure of about 45 bar and a temperature at about its bubble point, 9° C. Such a feed stream may be produced in a process to remove acid gases, e.g. carbon dioxide and hydrogen sulfide, from natural gas.

The feed may be dried (e.g. in a bed containing silica gel or alumina) prior to entering the cold process if necessary. A stream 100 of liquid feed is sub-cooled (to make the process more efficient) in heat exchanger HE1 to produce a stream 102 of cooled feed liquid which is expanded in a dense fluid expander E1 to recover energy and to produce a stream 104 of expanded fluid. The expander E1 may be replaced with a throttling valve, or may have a valve in series or parallel with it.

The expanded fluid is used to provide refrigeration duty in heat exchanger HE 1 thereby producing a stream 106 of crude carbon dioxide gas which is fed to the column C1 of a distillation column system where it is separated into carbon dioxide-enriched overhead vapor containing about 99 mol. % carbon dioxide and bottoms liquid containing about 72 mol. % hydrogen sulfide. Any light impurities, such as methane, from the feed will concentrate in the overhead vapor. In this process, the column is operating at a pressure of about 13 bar.

A portion 180 of the bottoms liquid is partially re-boiled by indirect heat exchange in heat exchanger HE1 to produce a two-phase stream 182. In the arrangement depicted, the re-boiler is an external, once-through re-boiler. However, other types of re-boiler such as thermosyphon or down flow boilers may be used, and may be located in the column C1.

The two-phase stream could be fed directly back to the column C1 to provide ascending vapor for the distillation process. However, in the embodiment depicted in the figure, the distillation column system comprises a vapor/liquid separator S2 and the two-phase stream 182 is fed to this separator where the vapor and liquid components are separated. The vapor component is fed as stream 184 to column C1 and the liquid component derived from the bottoms liquid is fed as stream 186 to a pump P3 where it is pumped to a pressure of about 48 bar. A stream 188 of pumped liquid is then warmed by indirect heat exchange in heat exchanger HE1 to produce a stream 190 of warmed liquid. The liquid does not evaporate in the heat exchanger HE1 as it has been pumped. The warmed liquid is pumped further in pump P4 to provide a stream 192 of pumped waste liquid at a pressure of about 208 bar. The composition of the waste liquid is about 94 mol. % hydrogen sulfide and about 6 mol. % carbon dioxide with trace amounts of propane and methanol.

The working fluid of the heat pump cycle in this process is taken from the column C1 as carbon dioxide-enriched overhead vapor. In this connection, overhead vapor is removed from the column C1 and warmed in heat exchanger HE1 to produce a stream 114 of warmed carbon dioxide-enriched overhead gas. In this process, a first stream 110 of overhead vapor is removed from the top of the column C1 and warmed by indirect heat exchange in the heat exchanger HE1 to produce a first stream 112 of warmed overhead gas. A second stream 140 of overhead vapor is removed from a further vapor/liquid separator S1 and warmed by indirect heat exchange in the heat exchanger HE1 to produce a second stream 142 of warmed overhead gas. At least a portion 144 of the second stream 142 of warmed overhead gas is combined with the first stream 112 of overhead gas to form the stream 114 of warmed carbon dioxide-enriched overhead gas. However, the skilled person would readily appreciate that (i) the combination of the vapor component from separator S1 with the overhead vapor from the column C1 could take place at the cold end of the heat exchanger HE1, and (ii) the separator S1 could easily be eliminated and all of the overhead vapor could be removed from the top of the column C1 (e.g. see FIG. 4). A portion 146 of the second stream 142 of warmed overhead gas may be purged from the process to prevent an undesirable build-up of the more volatile impurities such as methane.

The warmed overhead gas is compressed in a compressor system to produce a recycle stream 130 of compressed carbon dioxide-enriched gas.

It should be noted that, while the compressor system in FIG. 1 is depicted as having two stages, CP1 and CP2, other compressor systems having a single stage or multiple stages could be used. The important point is that, irrespective of how the stream is compressed, the heat pump cycle of this comparative process has only a single recycle fluid and hence only a single recycle pressure which, in this case, is about 33 bar.

It should also be noted that the compressor systems depicted not only in FIG. 1 but also in FIGS. 2 to 14 may include intercoolers and/or after coolers, even though these features are not explicitly shown in the figures.

Recycle fluid 130 is used to provide re-boil duty by indirect heat exchange in heat exchanger HE1, thereby at least partially re-boiling stream 180 of bottoms liquid. The recycle fluid is further cooled and condensed by indirect heat exchange in heat exchanger HE1 to produce a stream 132 of condensed recycle fluid which is then expanded across expansion valve V2 to produce a stream 134 of expanded carbon dioxide-enriched fluid having a vapor component and a liquid component. As mentioned above, this stream could be fed directly to the column C1 to provide reflux (e.g. see FIG. 4). However, the distillation column system depicted in FIG. 1 comprises the further separator S1 which is used to separate the vapor and liquid components. The vapor component 140 is used to provide a portion of the working fluid for the heat pump cycle (see above) and a portion 152 of the liquid component is used to provide reflux to the column C1.

Use of a reflux separator with purge allows the power consumption to be reduced by increasing the required condenser temperature and reducing the pressure required to drive the intermediate reboiler. Any purged vapor may be recompressed into the carbon dioxide product stream and recovered, depending on the value of carbon dioxide recovered compared to the power cost for the recompression.

A further portion 154 of the carbon dioxide-enriched liquid is removed from the distillation column system and pumped in pump P1 to produce a stream 156 of pumped carbon dioxide-enriched liquid at a pressure of about 80 bar. The pumped liquid 156 is then warmed by indirect heat exchange in heat exchanger HE1 to produce a stream 158 of warmed carbon dioxide-enriched liquid which is further pumped in pump P2 to produce a stream 160 of liquid carbon dioxide product at a pressure of about 153 bar. The liquid carbon dioxide product is substantially pure carbon dioxide (about 99 mol. %) representing a carbon dioxide recovery of about 99.5%. Carbon dioxide product 160 is in a form suitable for transport by pipeline or for use in EOR.

Refrigeration duty required to cool and, where appropriate, condense the recycle fluid 130 and the liquid feed 100 is provided by indirect heat exchange against the carbon dioxide-enriched overhead vapor(s) (streams 110 & 140), the pumped carbon dioxide-enriched liquid (stream 156), the pumped liquid derived from bottoms liquid (stream 188), the expanded fluid feed (stream 104) and the bottoms liquid (stream 180). No external refrigeration is used in the process, hence the process may be described as "auto-refrigerated".

While all of the indirect heat exchange between fluids is indicated as taking place in a single heat exchanger HE1 (e.g. an aluminum plate fin heat exchanger), the skilled person would appreciate that more than one heat exchanger could be used to effect the necessary heat transfers between particular process streams.

Preferred embodiments of the present invention are depicted in FIGS. 2 to 14. These embodiments may be viewed as modifications of the comparative process depicted in FIG. 1. The exemplified embodiments have many features in common with the comparative process depicted in FIG. 1 and other embodiments depicted in FIGS. 2 to 14. The common features between the processes have been assigned the same reference numerals. For convenience, a further discussion of the common features in not provided. The following is a discussion of the distinguishing features.

Figure 2:
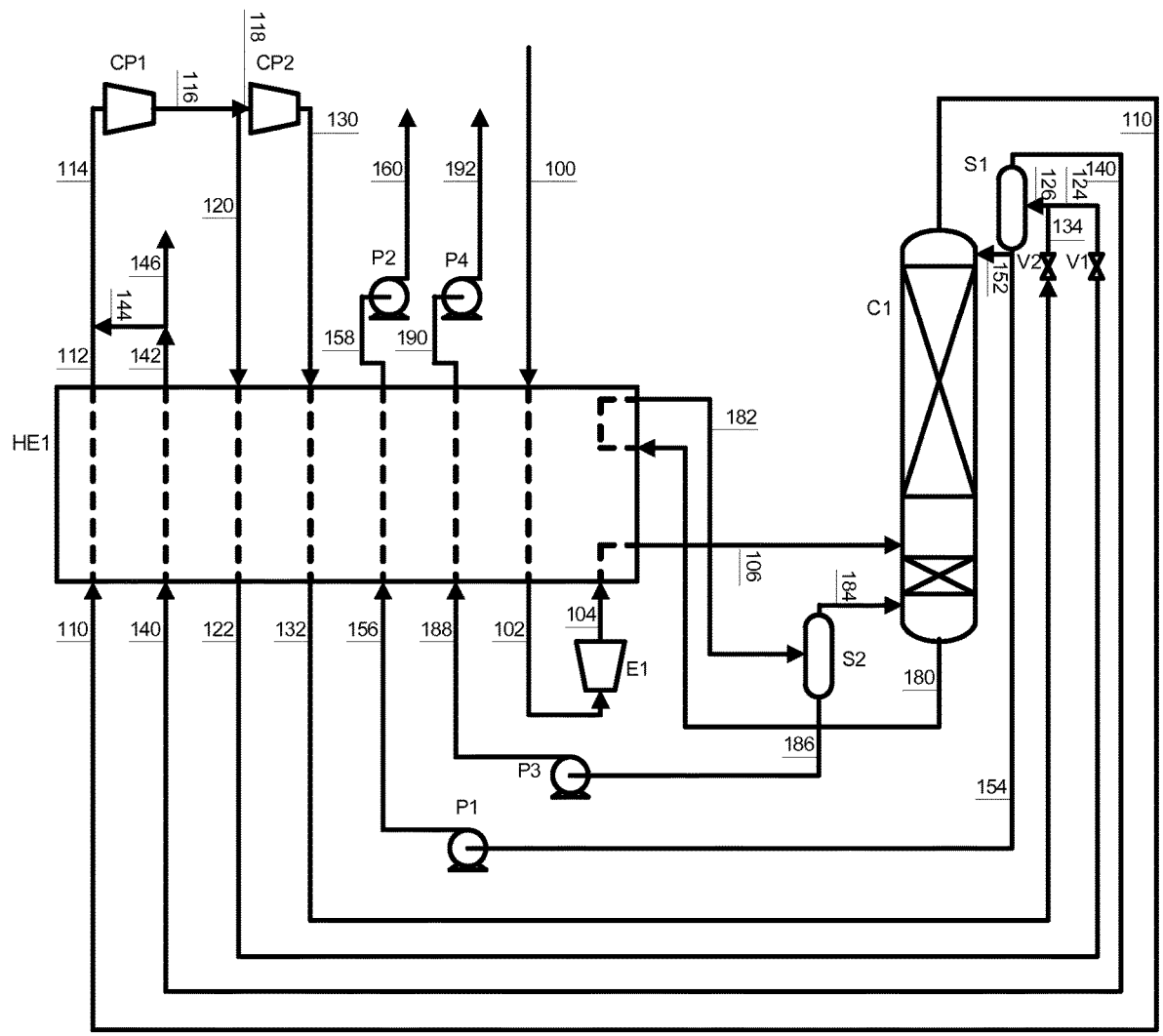
FIG. 2 is a flow sheet depicting a first embodiment of the present invention comprising a single heat pump cycle using carbon dioxide-enriched overhead vapor as a working fluid and operating at two different recycle pressures.

In FIG. 2, stream 114 of warmed carbon dioxide-enriched gas is compressed in a first compressor system CP1 to produce a stream 116 of compressed carbon dioxide-enriched gas at about 16 bar. Stream 116 is divided into sub-streams 118 and 120. Sub-stream 120 is used as a first recycle fluid. Sub-stream 118 is further compressed in a second compressor system CP2 to provide a stream 130 of a second recycle fluid at a pressure of about 28 bar. The ratio of molar flow in streams 120 and 130 is about 2:5 (i.e. about 0.4).

Streams 120 and 130 of recycle fluids are both used to provide re-boil duty by indirect heat exchange in heat exchanger HE1 and are both cooled and condensed to form streams 122 and 132 respectively of condensed carbon dioxide-enriched fluids. The fluids are expanded to the same pressure, i.e. the operating pressure of the column C1, across expansion valves V1 and V2 respectively to produce expanded fluids 124 and 134 respectively. As before, the expanded fluids could be fed directly to the column C1 to provide reflux. However, in this embodiment, the expanded fluids are combined to form stream 126 which is then fed to separator S1 to separate the vapor and liquid components.

In this embodiment, recycle fluid 120 is cooled and condensed by indirect heat exchange mainly against expanded feed liquid 104, and recycle fluid 130 is cooled and condensed by indirect heat exchange mainly against re-boiling bottoms liquid 180.

Figure 3:
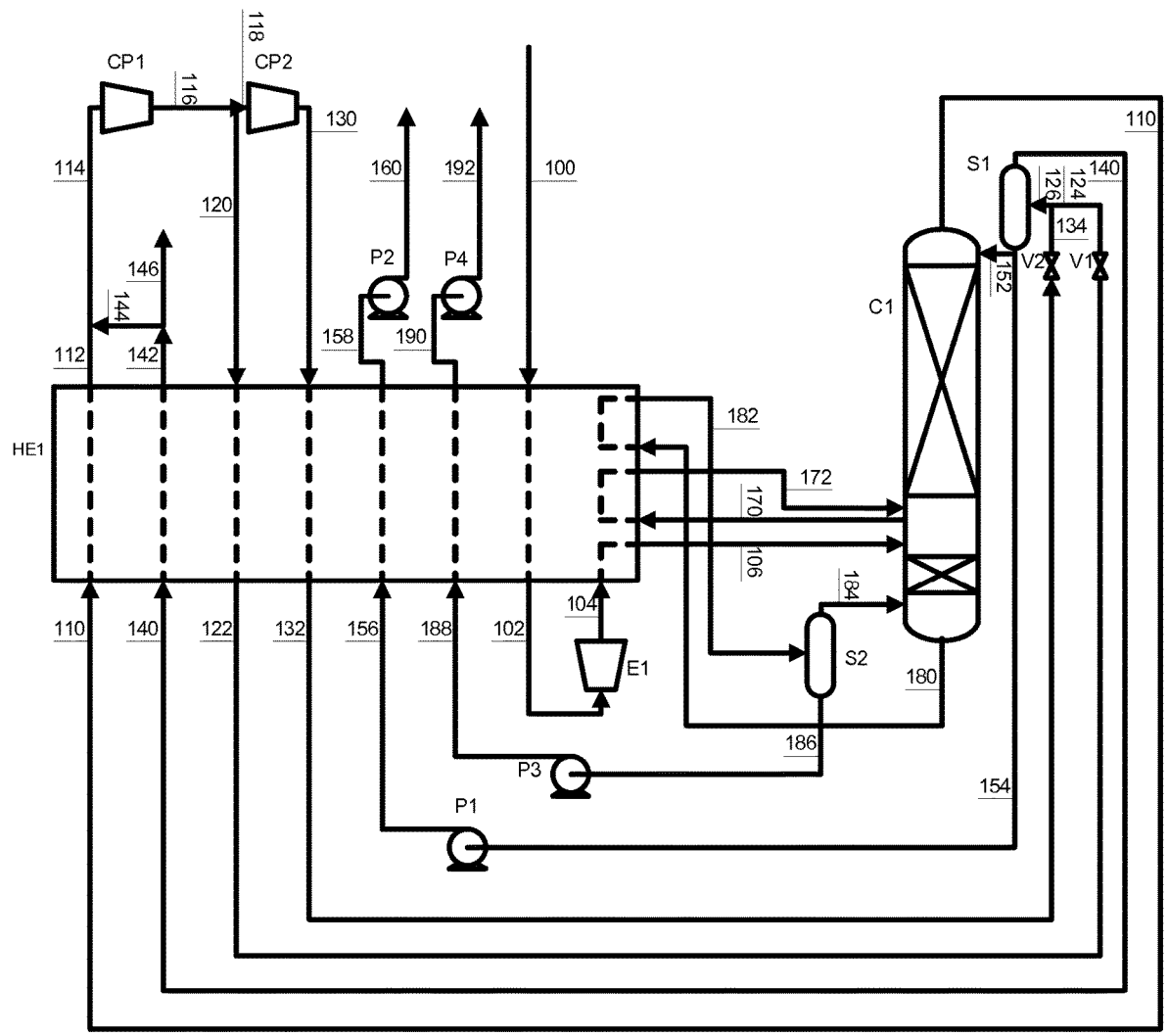
FIG. 3 is a flow sheet depicting a modified arrangement of the embodiment depicted in FIG. 2 in which the distillation column system comprises an intermediate re-boiler.

In FIG. 3, a stream 170 of liquid taken from an intermediate location in the column C1 is removed from the column C1 and at least partially re-boiled in heat exchanger HE1. The re-boiler is depicted as an external, once through re-boiler. However, the re-boiler may be internal in the column and/or other types of re-boiler such a thermosyphon or down flow re-boiler, may be used.

The duty for re-boiling the intermediate liquid is again provided by the recycle fluids 122 and 132. The molar flow ratio of streams 122 and 132 is about 10:1 (i.e. about 10). The bulk of the boil-up duty for the column C1 is provided by this intermediate re-boiler.

The products generated in the flow sheet of FIG. 3 are pumped to a high enough pressure that they do not evaporate. They are warmed in the main heat exchanger but not at such a high pressure that the cost of the heat exchanger is adversely affected. In an alternate configuration, the feed may be vapor and, in that case, part of it may be expanded to the column and part may be condensed and expanded as liquid. In this case, the pumped products from the column may be evaporated in the heat exchanger at appropriate pressures and temperatures to condense the feed.

While the feed is shown as being evaporated in the main exchanger HE1 before being fed to the column C1, this is not essential, and it may be only partially vaporized or fed as a liquid. In this case, the intermediate reboiler duty would increase in order to provide the equivalent boil-up within the column.

Figure 4:
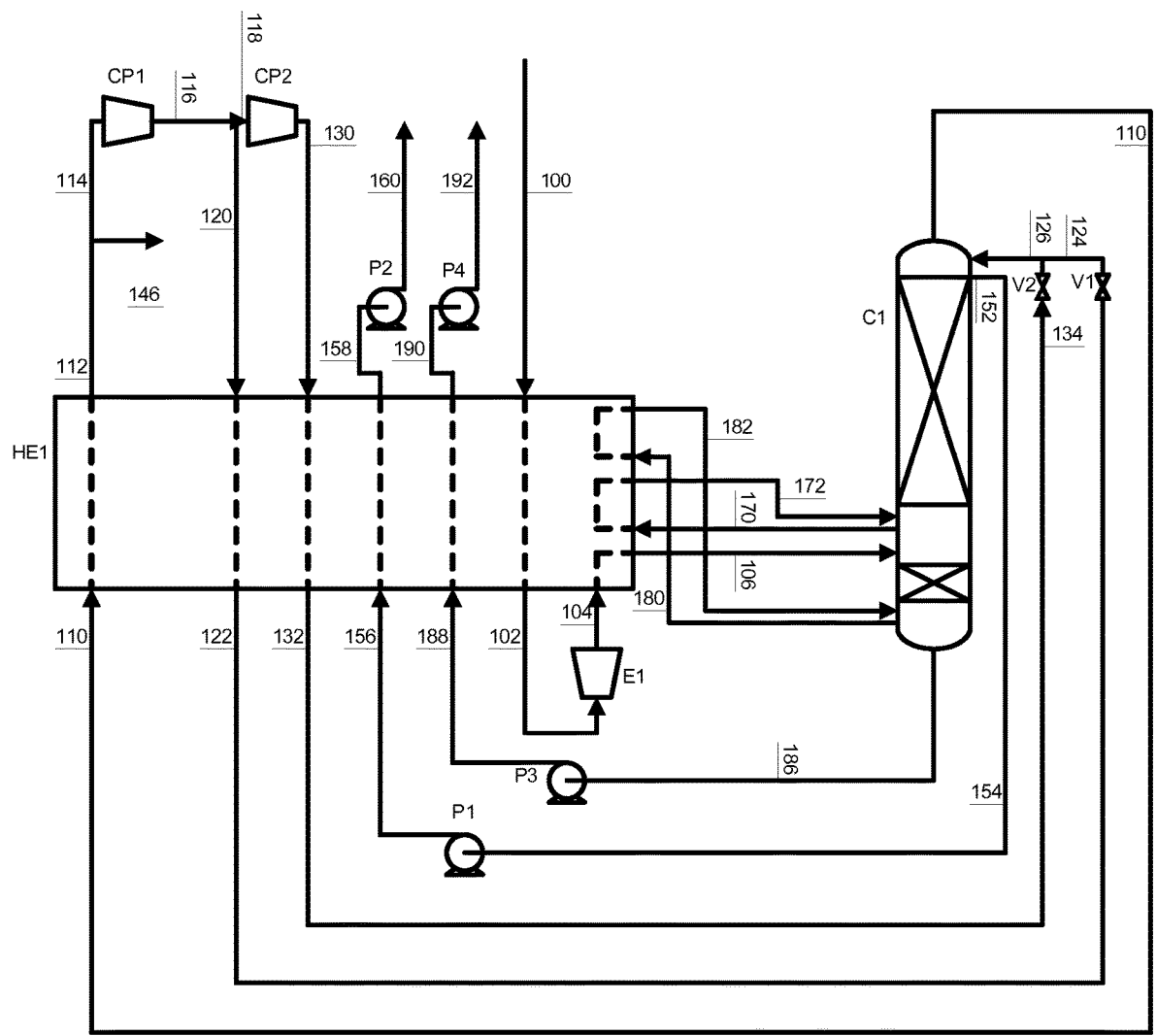
FIG. 4 is a flow sheet depicting a modified arrangement of the embodiment depicted in FIG. 3 in which separators S1 and S2 of the distillation column system have been eliminated.

The flow sheet depicted in FIG. 4 is a modified version of that depicted in FIG. 3 in which separators S1 and S2 are omitted from the distillation column system. Accordingly, re-boiled bottoms liquid 182 and expanded carbon dioxide-enriched fluid 126 are fed directly to column C1.

Figure 5:
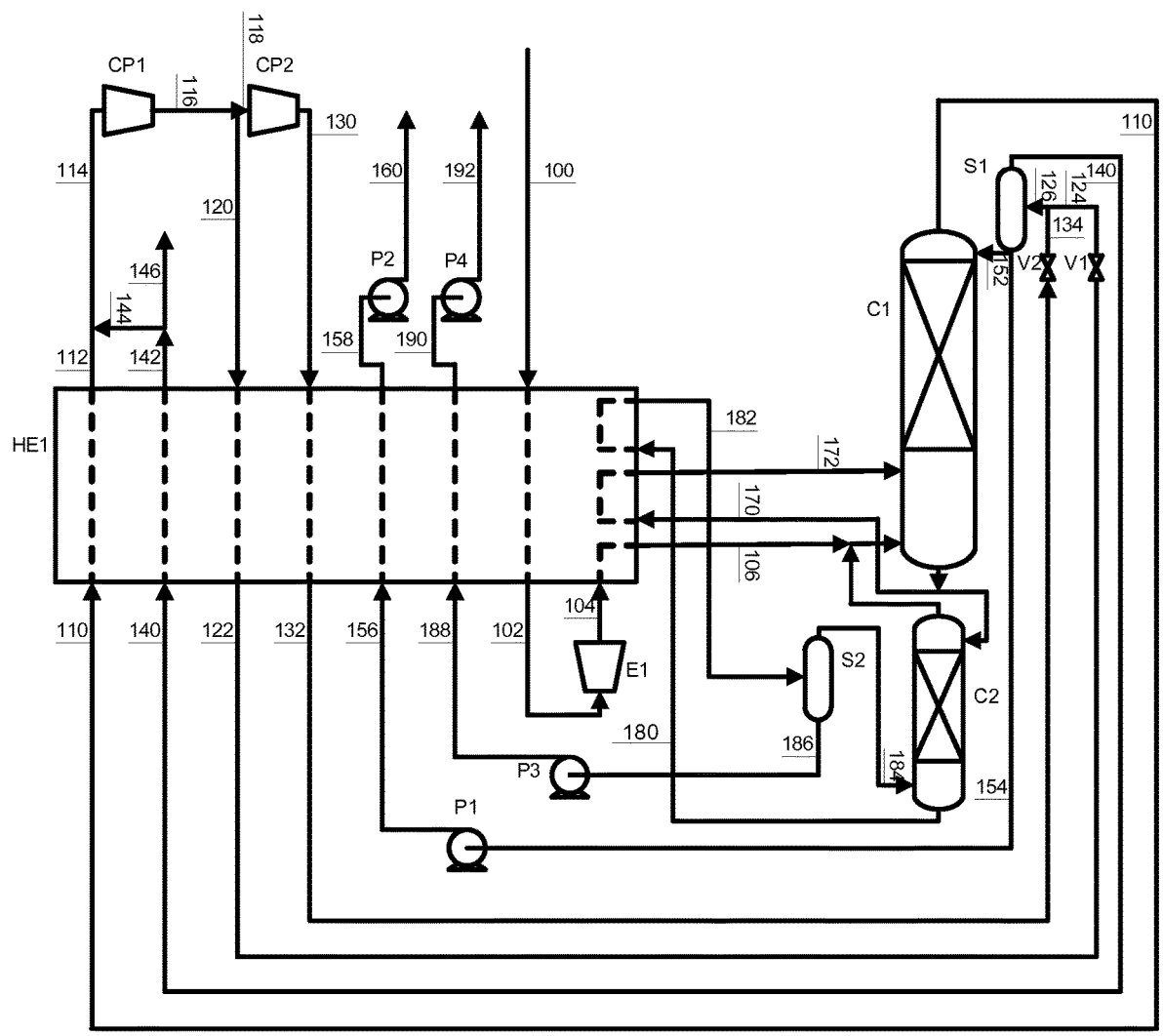
FIG. 5 is a flow sheet depicting a modified arrangement of the embodiment depicted in FIG. 3 involving a split column.

The flow sheet depicted in FIG. 5 is a modified version of that depicted in FIG. 3 in which the distillation column system involves a split column C1, both parts of the column having the same operating pressure. The vapor feed 106 is fed to the upper part of the column C1. Bottoms liquid from the upper part of the column C1 is used not only as "intermediate" liquid 170 being re-boiled in heat exchanger HE1 but also to provide reflux in the lower part of the column C1. Overhead vapor from the lower part of the column C1 is fed to the upper part of the column C1 with the feed vapor 106.

Figure 6:
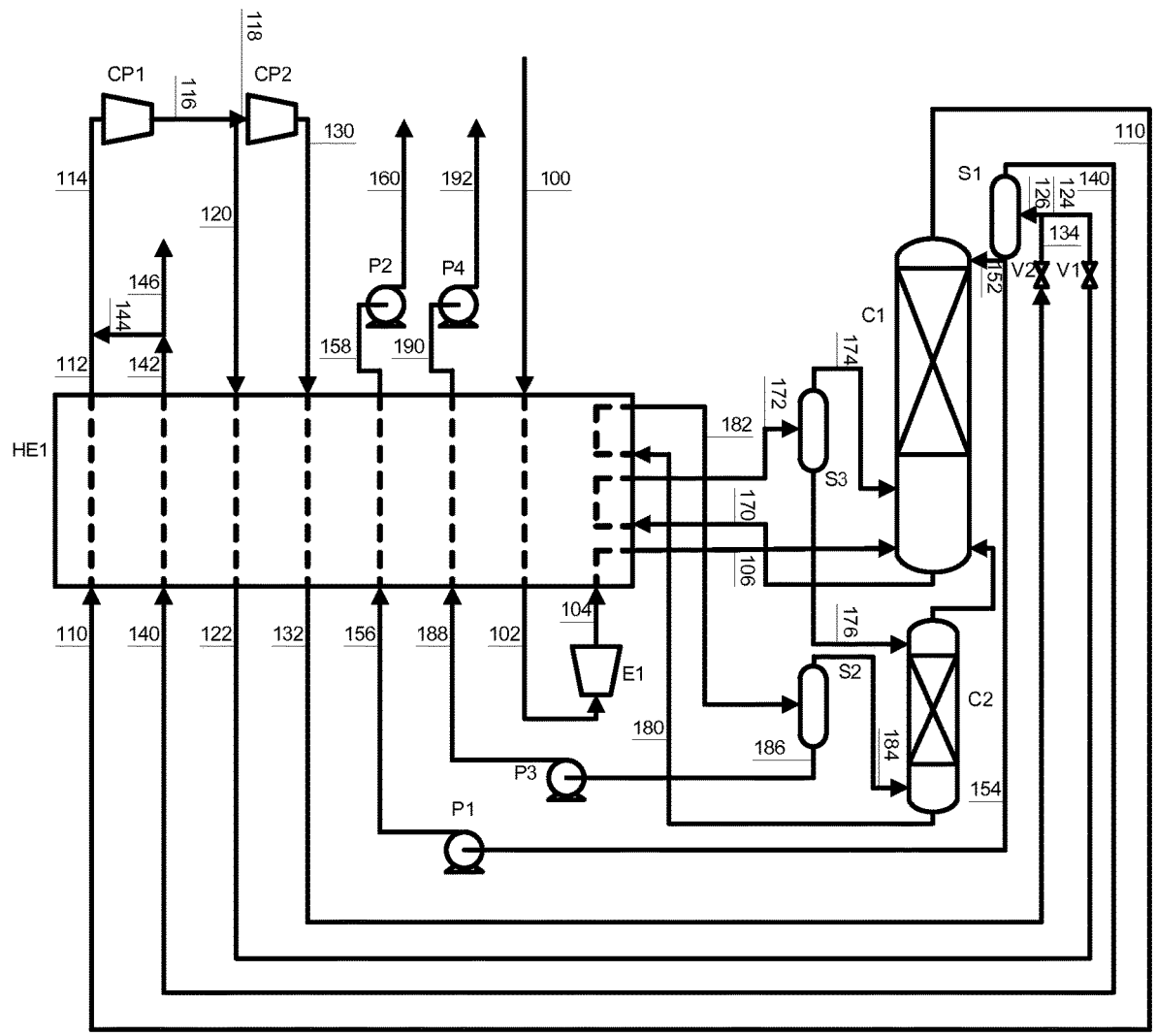
FIG. 6 is a flow sheet depicting a modified arrangement of the embodiment depicted in FIG. 5 involving a different re-boiler system.

The flow sheet depicted in FIG. 6 is a modified version of that depicted in FIG. 5 in which the arrangement for the intermediate re-boiler is different. In this connection, bottoms liquid from the upper part of the column C1 is partially re-boiled by indirect heat exchange in the heat exchanger HE1. Stream 172 therefore has a liquid component and a vapor component which are separated in a third vapor/liquid separator S3. The liquid component is fed to the lower part of the column C1 as reflux and the vapor component is fed to the upper part of the column C1. Overhead vapor from the lower part of the column C1 is fed to the upper part of the column C1.

Figure 7:
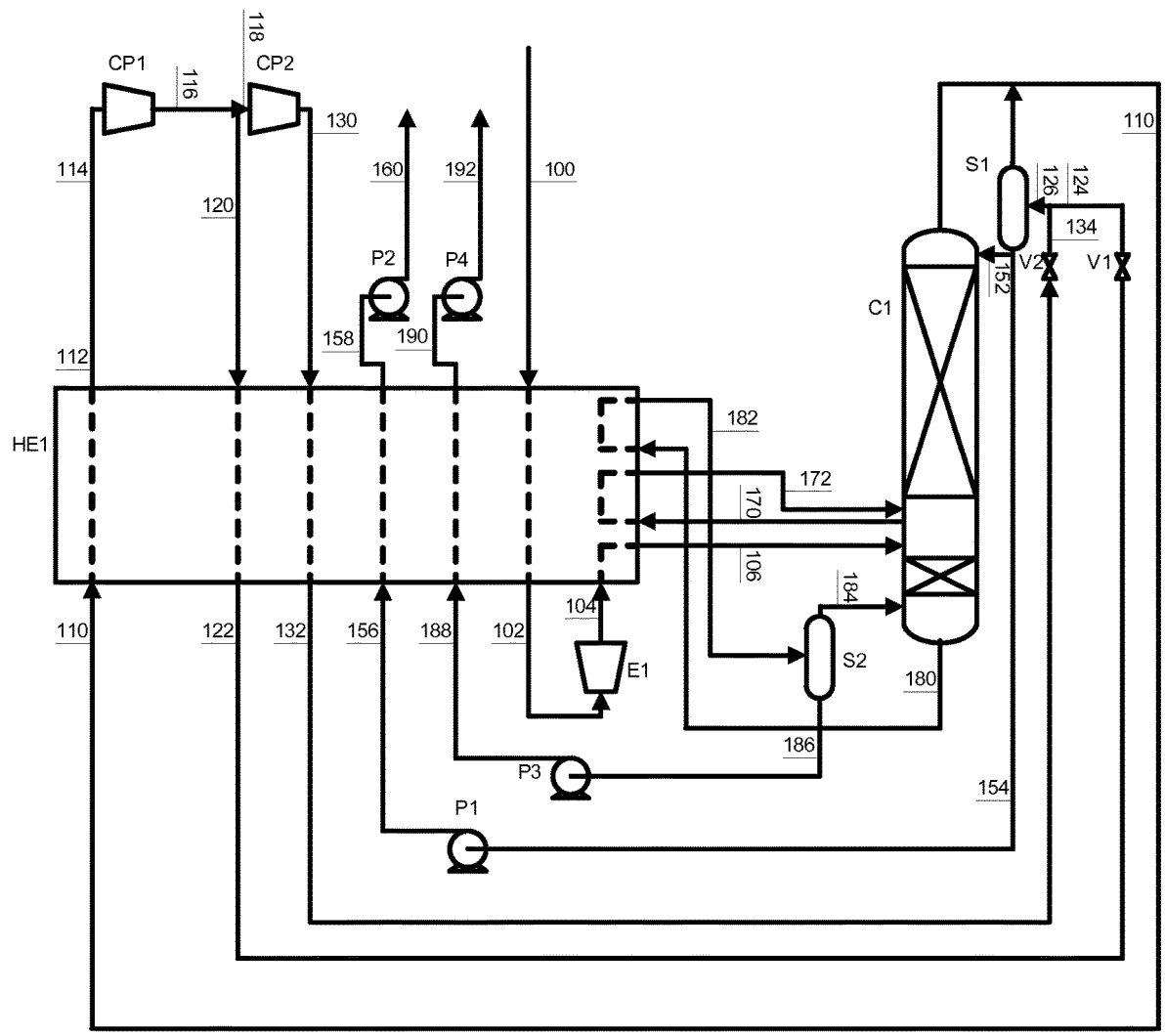
FIG. 7 is a flow sheet depicting a modified arrangement of the embodiment depicted in FIG. 3 in which the purge has been eliminated.

The flow sheet depicted in FIG. 7 is a modified version of that depicted in FIG. 3 in which the purge stream 146 is omitted. The overhead vapor from separator S1 is combined with overhead vapor from column C1 to form stream 140 of carbon dioxide-enriched overhead vapor.

Figure 8:
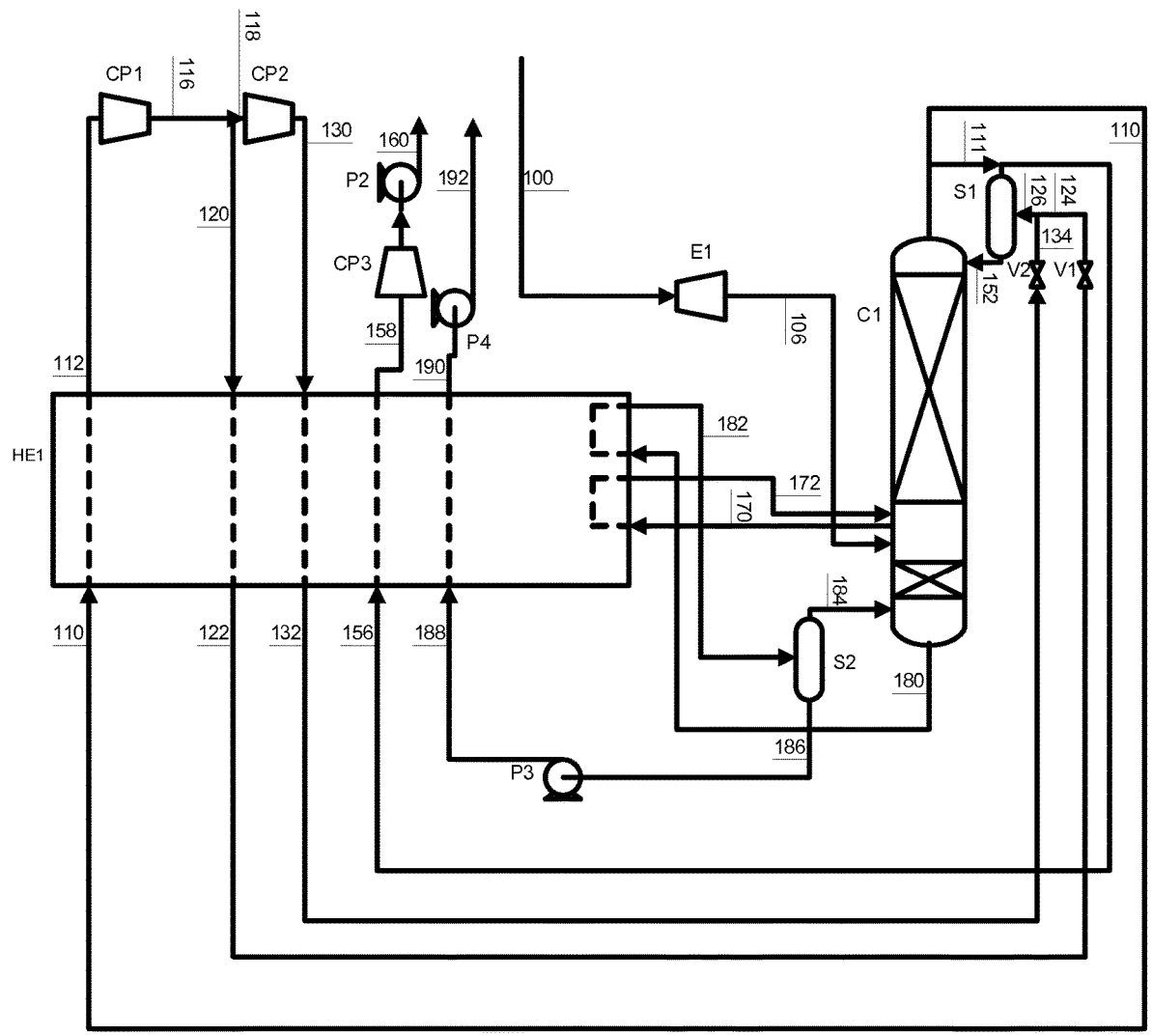
FIG. 8 is a flow sheet depicting a modified arrangement of the embodiment depicted in FIG. 7 in which the feed to the process is a saturated vapor rather than a liquid.

The flow sheet depicted in FIG. 8 is a modified version to that depicted in FIG. 3 in which the feed 100 to the process is in the form of a saturated vapor. The feed 100 is expanded in expander E1 without first cooling the feed by indirect heat exchange in the heat exchanger HE1. Expanded feed 106 to the column C1 is about 13% condensate. Overhead vapor from the column C1 is used as working fluid for the heat pump cycle as in FIG. 3. However, all of the recycled carbon dioxide-enriched liquid is fed to the column C1 as reflux and none is removed from the distillation column system to form a liquid carbon dioxide product. In contrast, a portion 111 of overhead vapor from the column C1 is combined with the vapor component separated in separator S1 to form stream 156 of carbon dioxide-enriched vapor which is warmed by indirect heat exchange in heat exchanger HE1 to produce a stream 158 of warmed carbon dioxide-enriched gas. The gas is compressed in compressor system CP3 and pumped in pump P2 to form a stream 160 of gaseous carbon dioxide product at a pressure of about 110 bar.

Figure 9:
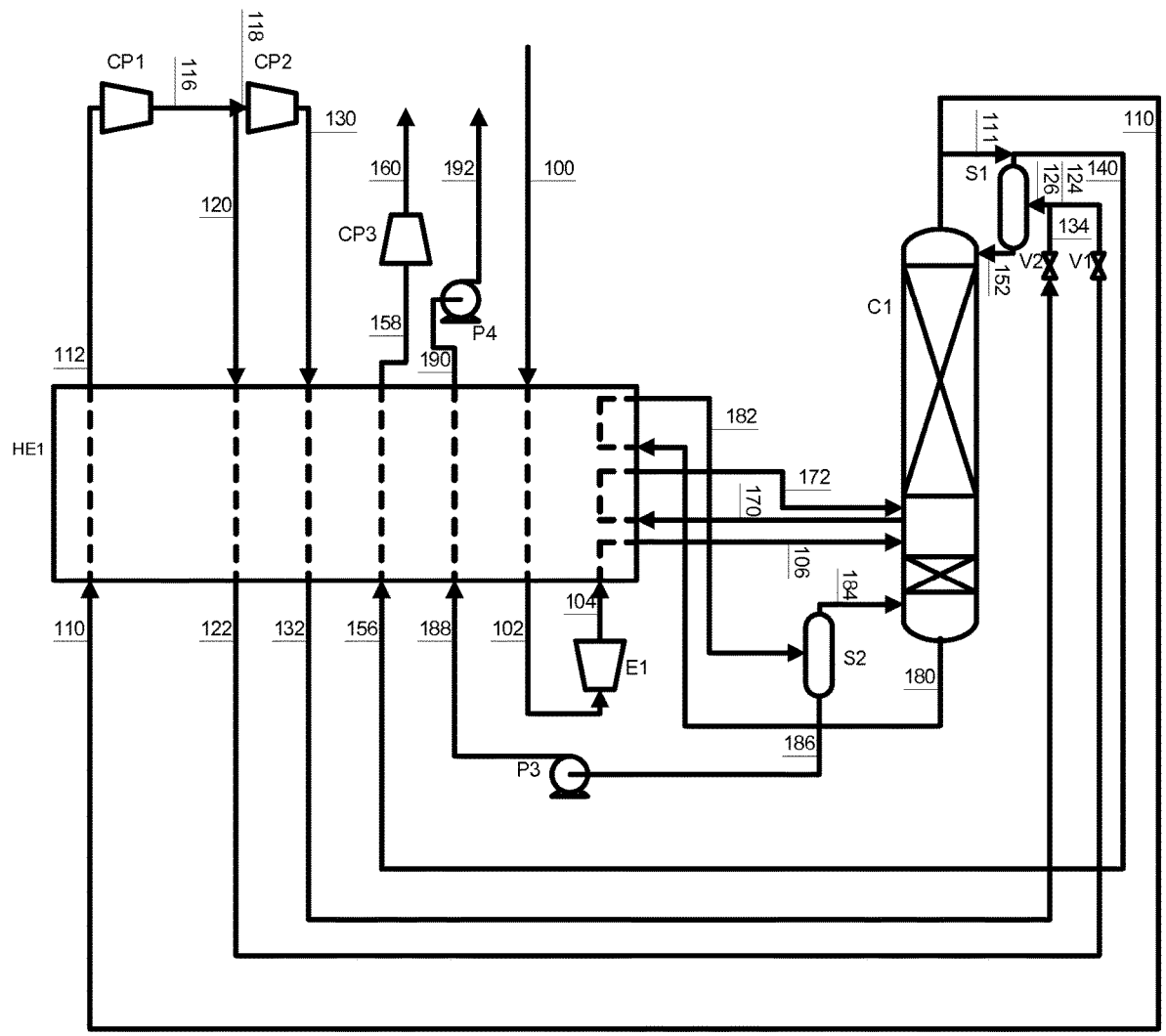
FIG. 9 is a flow sheet depicting a different modified arrangement of the embodiment depicted in FIG. 8 in which the feed to the process is a vapor.

The flow sheet depicted in FIG. 9 is a modified version of that depicted in FIG. 8 in which the vapor feed 100 to the process is cooled by indirect heat exchange in heat exchanger HE1 prior to expansion and the expanded stream 104 is then warmed by indirect heat exchange in heat exchanger HE1 prior to being fed to the column C1.

Figure 10:
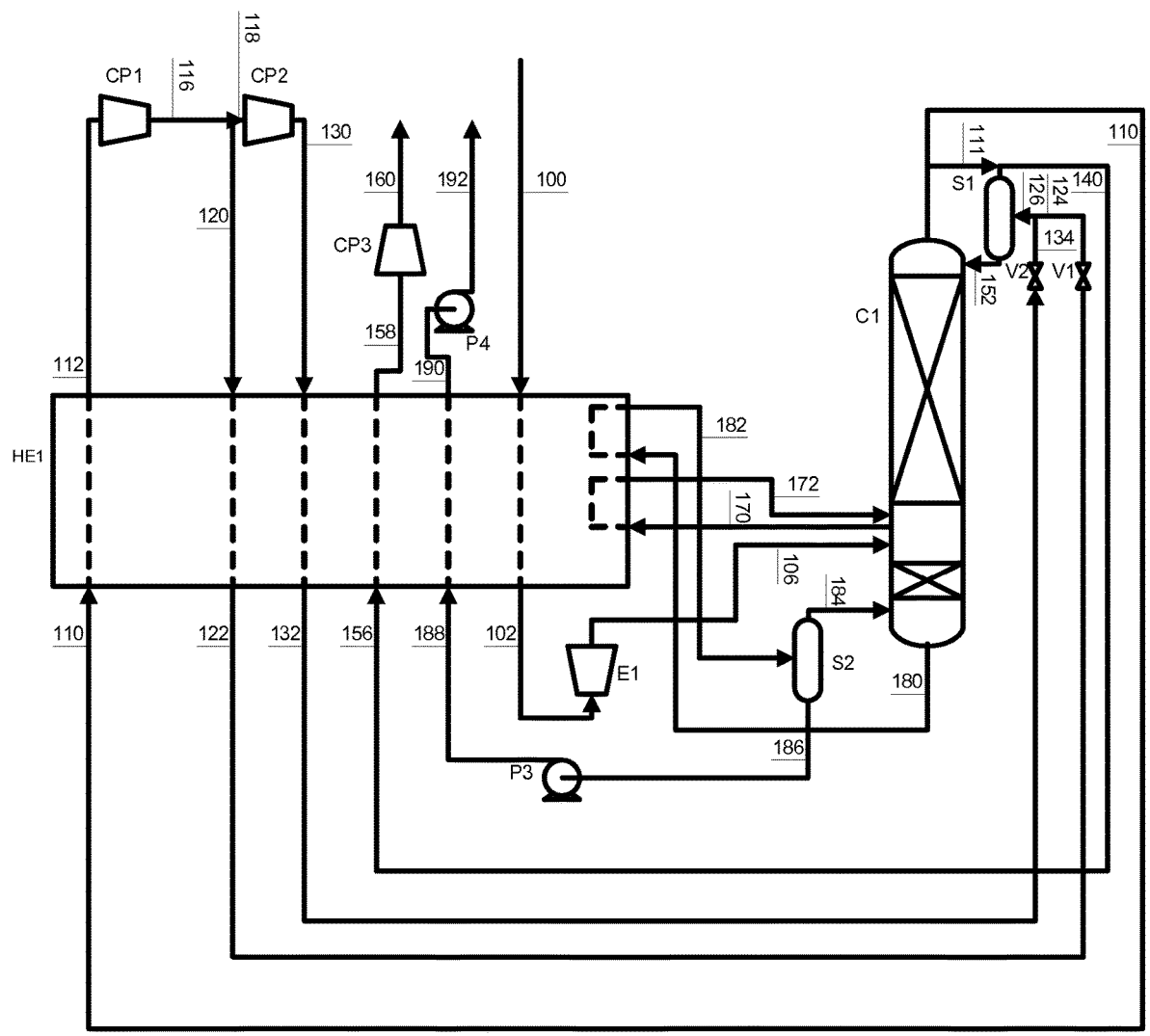
FIG. 10 is a flow sheet depicting a further modified arrangement of the embodiment depicted in FIG. 8 in which the feed to the process is a vapor.

The flow sheet depicted in FIG. 10 is a modified version of that depicted in FIG. 9 in which the expanded stream 104 is fed directly to the column C1 without first being warmed in the heat exchanger HE1.

Figure 11:
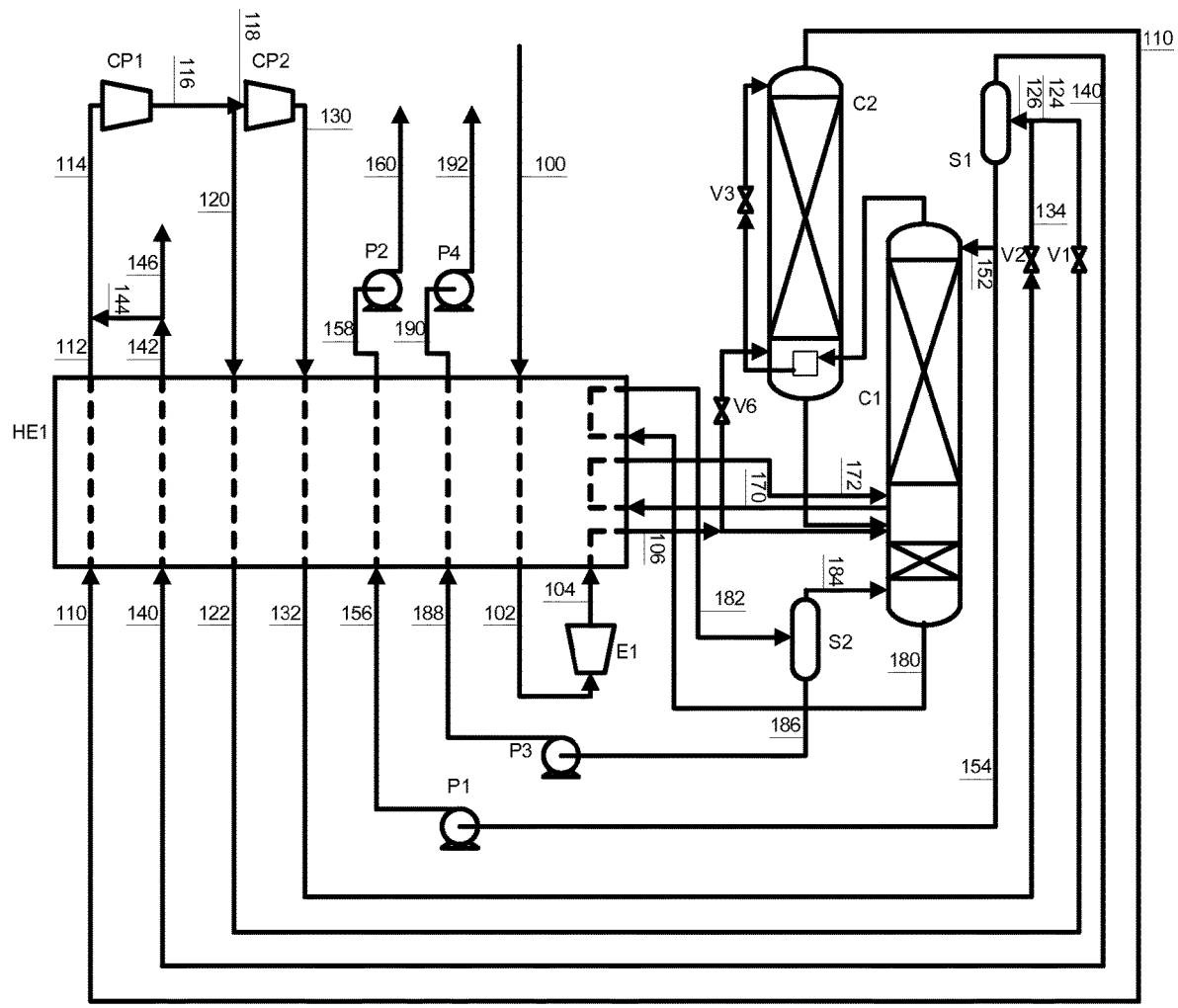
FIG. 11 is a flow sheet depicting a modified arrangement of the embodiment depicted in FIG. 3 in which the distillation column system comprises a double column.

The flow sheet depicted in FIG. 11 is a modified version of that depicted in FIG. 3 in which the distillation column system comprises a dual column arrangement with a first column C1 operating at a higher pressure than a second column C2. The feed 106 is at the operating pressure of the first column C1. The feed is split with a first portion being fed directly to the first column C1 and the second portion being reduced in pressure across expansion valve V6 and then fed to the second column C2.

The feed to the first column C1 is separated into an intermediate overhead vapor and the bottoms liquid. The intermediate overhead vapor used to re-boil bottoms liquid in the second column C2 and as a result is itself condensed. The condensed stream is reduced in pressure across expansion valve V3 and is then used to provide reflux to the second column C2.

The feed to the second column C2 is separated into the carbon dioxide-enriched overhead vapor and an intermediate bottoms liquid which is fed to the first column C1. Second column C2 is elevated in relation to the first column C1. Therefore, the pressure of the intermediate bottoms liquid is raised by static head. However, a pump (not shown) may be used to raise the pressure of the intermediate bottoms liquid.

Figure 12:
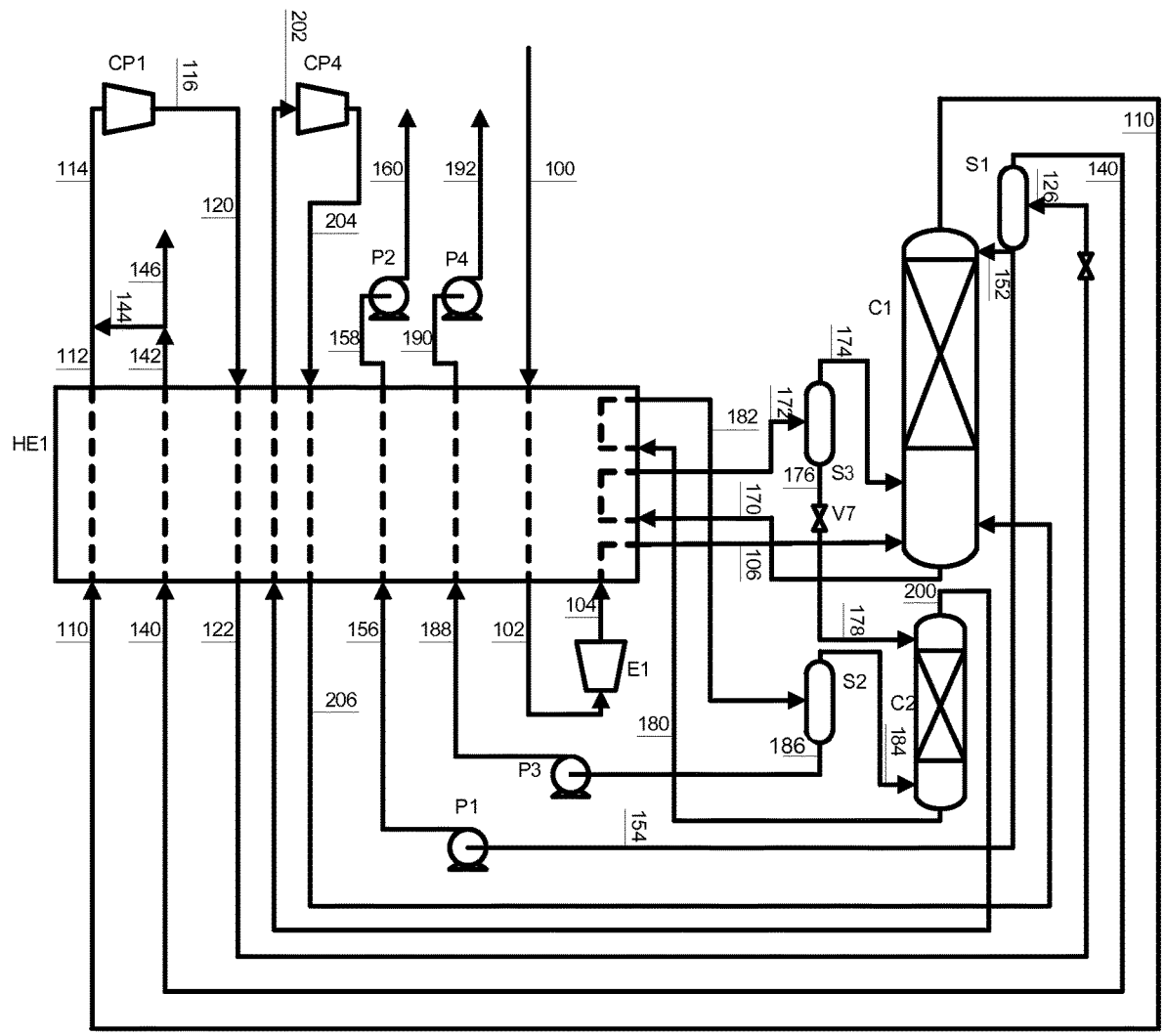
FIG. 12 is a flow sheet depicting a second embodiment of the present invention comprising a first heat pump cycle using carbon dioxide-enriched overhead vapor as a working fluid and a second heat pump cycle using a crude carbon dioxide working fluid.

The flow sheet depicted in FIG. 12 is similar to that depicted in FIG. 6 although, rather than a split column C1 in FIG. 6, the flow sheet in FIG. 12 involves a dual column with a first column C1 operating at a higher pressure than a second column C2. In addition, rather than a single heat pump cycle generating two recycle fluids as in FIG. 6, the flow sheet of FIG. 12 involves two separate heat pump cycles, each generating a single recycle fluid.

The working fluid for the first heat pump cycle is carbon dioxide-enriched overhead vapor from the first column C1 which is warmed by indirect heat exchange in heat exchanger HE1 and then compressed in a first compressor system CP1 to produce a first recycle fluid 120.

Intermediate overhead vapor from the second column C2 is not fed to the first column C1 as in FIG. 6. In contrast, the working fluid for the second heat pump cycle is the intermediate overhead vapor 200 taken from the second column C2 which is warmed by indirect heat exchange in heat exchanger HE 1 and then compressed in a second compressor system CP4 to produce a second recycle fluid at the operating pressure of the first column C1.

Re-boil duty is provided by indirect heat exchange in heat exchanger HE1 between the recycle fluids and the bottoms liquids from the two columns in the distillation column system.

The recycle fluids are further cooled by indirect heat exchange in heat exchanger HE1. The carbon dioxide-enriched liquid 122 from the first recycle stream is expanded across expansion valve V1 and, after vapor/liquid separation, the liquid component 156 is fed to the first column C1 as reflux. The crude carbon dioxide fluid 206 of the second recycle fluid after cooling is fed to the first column.

The pressure of the liquid component 176 from separator S3 is dropped across expansion valve V7 before the liquid is fed as reflux to the second column C2.

Figure 13:
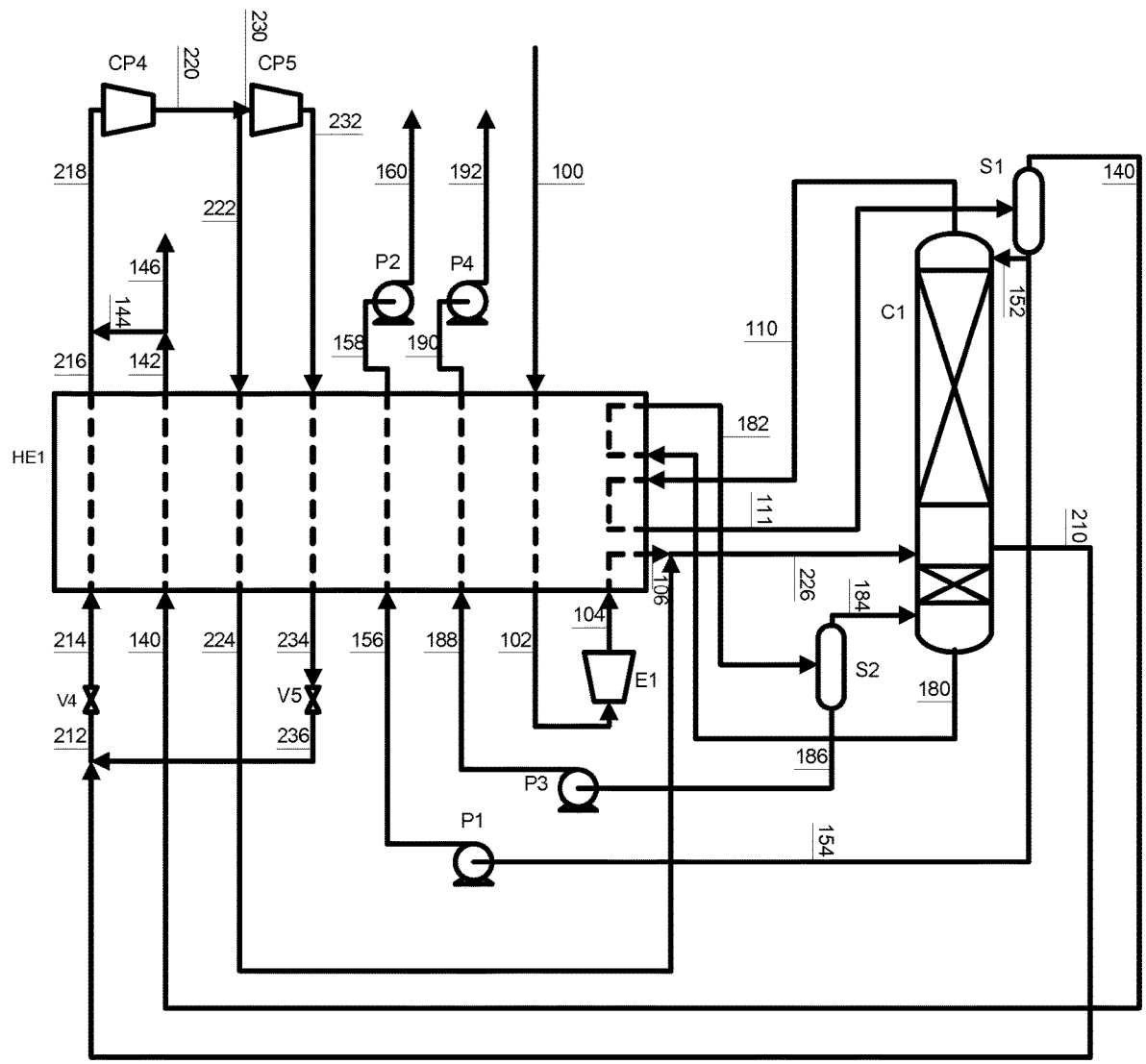
FIG. 13 is a flow sheet depicting a third embodiment of the present invention comprising a single heat pump cycle using a crude carbon dioxide working fluid operating at two different recycle pressures.

The flow sheet depicted in FIG. 13 is a modified version of that depicted in FIG. 3. In FIG. 3, the working fluid in the heat pump cycle is carbon dioxide-enriched overhead vapor. In FIG. 13, crude carbon dioxide fluid is used. In this connection, a stream 210 of crude carbon dioxide liquid is removed from an intermediate location of the column C1 and is combined with a recycle stream 236 (see below) to form combined stream 212 which is reduced in pressure across expansion valve V4 to produce expanded stream 214. The expanded stream 214 is warmed and evaporated by indirect heat exchange in heat exchanger HE1 to produce crude carbon dioxide gas stream 216 which is combined with warmed carbon dioxide-enriched overhead vapor 144 (see below) to produce a stream 218 of carbon dioxide-rich gas.

The carbon dioxide-rich gas 218 is compressed in first compressor system CP4 to produce compressed gas 220 which is divided into a first recycle stream 222 and a second portion 230. The second portion is compressed further in a second compressor system CP5 to produce a second recycle stream 232.

Re-boil duty for the column C1 is provided by indirect heat exchange in heat exchanger HE1 against the two recycle streams which are then further cooled by indirect heat exchange. The further cooled first recycle stream 224 is combined with a crude carbon dioxide feed 106 to provide a combined feed 226 for the column C1. The further cooled second recycle stream 234 is expanded across expansion valve V5 and the expanded liquid 236 combined with the crude carbon dioxide liquid 210 taken from the column C1.

The distillation column system comprises an overhead condenser arrangement in which overhead vapor 110 is removed and partially condensed by indirect heat exchange in the heat exchanger HE1. The partially condensed stream 111 is fed to a vapor/liquid separator S1 where the vapor and liquid components are separated. The liquid component is used to provide reflux to the column C1 (stream 152) and to provide the liquid carbon dioxide product (streams 154 to 160). The vapor component 140 is warmed by indirect heat exchange in heat exchanger HE1 to produce a stream 142 to overhead gas. A portion 144 of the overhead gas is combined with the warmed crude carbon dioxide gas 216. A further portion 146 may be purged from the process.

The flow sheet depicted in FIG. 14 is a modified version of that depicted in FIG. 1. The only difference between the flow sheets is that, in FIG. 14, the distillation column system C1 has an intermediate re-boiler. In this regard, a stream 170 of liquid taken from an intermediate location in the column C1 is removed from the column C1 and at least partially re-boiled in heat exchanger HE1. The two-phase reboiled stream 172 is returned to column C1. The re-boiler is depicted as an external, once through re-boiler. However, the re-boiler may be internal in the column and/or other types of re-boiler such a thermosyphon or down flow re-boiler may be used.

The flow sheet in FIG. 15 is a modified version of that depicted in FIG. 13. The only difference between the flow sheets is that, in FIG. 15, there is no second recycle fluid in the heat pump cycle. Thus, the entire stream 220 of compressed intermediate recycle gas is cooled as stream 222 in HE1 by indirect heat exchange and is combined with the primary feed 106 to the distillation column system C1.

Aspects of the present invention include:

1. A process for purifying crude carbon dioxide comprising at least one impurity that is less volatile than carbon dioxide, said process comprising feeding crude carbon dioxide feed at sub-ambient temperature to a distillation column system operating at super-atmospheric pressure(s) for separation to produce carbon dioxide-enriched overhead vapor and bottoms liquid enriched with said at least one impurity;

providing carbon dioxide-enriched liquid as reflux for said distillation column system;

at least partially re-boiling a portion of said bottoms liquid by indirect heat exchange to provide vapor for said distillation column system;

at least partially re-boiling a portion of said bottoms liquid by indirect heat exchange to provide vapor for said distillation column system;

wherein re-boiling duty for said distillation column system is provided at least in part by indirect heat exchange against recycle fluids from at least one heat pump cycle using a carbon dioxide-containing fluid from said distillation column system as working fluid, at least one of said recycle fluids having a different pressure from the other recycle fluid(s).

2. A process according to #1 comprising a single heat pump cycle comprising a least a first recycle fluid and a second recycle fluid, said second recycle fluid having a pressure that is greater than that of said first recycle fluid.

3. A process according to #2, wherein the pressure of said second recycle fluid is at least 10% greater than the pressure of said first recycle fluid.

4. A process according to #2 or #3, wherein the pressure of said first recycle fluid is from about 15 bar to about 30 bar.

5. A process according to any of #2 to #4, wherein the pressure of said second recycle fluid is from about 20 bar to about 70 bar.

6. A process according to any of #2 to #5, wherein said working fluid comprises carbon dioxide-enriched gas generated by warming said carbon dioxide-enriched overhead vapor by indirect heat exchange.

7. A process according to #6, wherein at least a portion of the duty required to warm said carbon dioxide-enriched overhead vapor is provided by indirect heat exchange against at least one of said recycle fluids.

8. A process according to any of #2 to #7, wherein said recycle fluids are recycled to an appropriate location in said distillation column system after suitable pressure reduction.

9. A process according to any of #2 to #8, wherein ratio of molar flow of said first recycle fluid to said second recycle fluid is from about 0.1 (i.e. 1:10) to about 10 (i.e. 10:1).

10. A process according to #9, wherein said ratio is from about 3 (i.e. 3:1) to about 10 (i.e. 10:1).

11. A process according to #2, wherein said working fluid comprises crude carbon dioxide gas generated by evaporating "intermediate" liquid taken from an intermediate location in said distillation column system by indirect heat exchange after suitable pressure reduction.

12. A process according to #11, comprising at least partially condensing carbon dioxide-enriched overhead vapor by indirect heat exchange to produce at least partially condensed carbon dioxide-enriched overhead vapor as said reflux for said distillation column system.

13. A process according to #12, wherein at least a portion of the duty required to cool and at least partially condense said carbon dioxide-enriched overhead vapor is provided by indirect heat exchange against at least one "cold" process stream.

14. A process according to any of #11 to #13, wherein at least a portion of the duty required to evaporate said "intermediate" liquid is provided by indirect heat exchange against at least one of said recycle fluids.

15. A process according to any of #11 to #14, wherein said "intermediate" liquid has a composition that is at least substantially identical to said crude carbon dioxide feed.

16. A process according to any of #11 to #15, wherein said first recycle fluid is recycled as part of said feed to said distillation column system.

17. A process according to any of #11 to #16, wherein said second recycle fluid is recycled as part of said working fluid for said heat pump cycle after suitable pressure reduction.

18. A process according to #1 comprising at least a first heat pump cycle and a second heat pump cycle, each heat pump cycle comprising at least one recycle fluid, said recycle fluid of said first heat pump cycle or, where the first heat pump cycle has more than one recycle fluid, at least one of said recycle fluids, having a pressure that is greater than that of a recycle fluid of said second heat pump cycle.

19. A process according to #18, wherein the pressure of said recycle fluid of said first heat pump cycle is at least 10% greater than the pressure of said recycle fluid of said second heat pump cycle.

20. A process according to #18 or #19, wherein the pressure of said recycle fluid of said first heat pump cycle is from about 15 bar to about 60 bar.

21. A process according to any of #18 to #20, wherein said working fluid of said first heat pump cycle comprises carbon dioxide-enriched gas generated by warming said carbon dioxide-enriched overhead vapor by indirect heat exchange.

22. A process according to #21, wherein at least a portion of the duty required to warm said carbon dioxide-enriched overhead vapor is provided by indirect heat exchange against at least one of said recycle streams.

23. A process according to any of #18 to #22, wherein the pressure of said recycle fluid of said second heat pump cycle is from about 10 bar to about 25 bar.

24. A process according to any of #18 to #23, wherein said working fluid of said second heat pump cycle comprises crude carbon dioxide gas generated by warming "intermediate" vapor taken from an intermediate location of said distillation column system by indirect heat exchange.

25. A process according to #24, wherein at least a portion of the duty required to warm said "intermediate" vapor is provided by indirect heat exchange against at least one of said recycle fluids.

26. A process according to #24 or #25, wherein said crude carbon dioxide gas has a composition that is at least substantially identical to said crude carbon dioxide feed.

27. A process according to #18 to #26 wherein said recycle streams are recycled to appropriate locations in said distillation column system after suitable pressure reduction if required.

28. A process according to any of #1 to #27, liquid from an intermediate location in said distillation column system is at least partially re-boiled by indirect heat exchange to provide additional vapor for said distillation column system.

29. A process according to #28, wherein at least a portion of the re-boiling duty is provided by indirect heat exchange against at least one of said recycle fluids.

30. A process according to any of #1 to #29, wherein a portion of said working fluid is purged from said process.

31. A process according to any of #1 to #30, wherein said reflux for said distillation column system is provided by at least one recycle fluid condensate after suitable pressure reduction.

32. A process according to #31, wherein the refrigeration duty required to cool and at least partially condense at least one recycle fluid is provided by indirect heat exchange against at least one "cold" process stream.

33. A process according to any of #1 to #32, wherein said reflux for said distillation column system is provided by condensed overhead vapor.

34. A process according to #33, wherein the refrigeration duty required to cool and at least partially condense overhead vapor is provided by indirect heat exchange against at least one "cold" process stream.

35. A process according to any of #1 to #34, wherein said crude carbon dioxide feed is crude carbon dioxide fluid derived from a natural source of carbon dioxide and expanded prior to feeding to said distillation column system.

36. A process according to #35, wherein, prior to said expansion, said crude carbon dioxide fluid is at a super-critical pressure and a sub-critical temperature.

37. A process according to #35 or #36, wherein said crude carbon dioxide fluid is cooled by indirect heat exchange prior to expansion.

38. A process according to #37, wherein at least a portion of the duty required to cool said crude carbon dioxide fluid is provided by indirect heat exchange against at least one "cold" process stream.

39. A process according to any of #35 to #38, wherein said expanded crude carbon dioxide is used as a "cold" process stream to provide refrigeration duty for said process.

40. A process according to any of #35 to #38, wherein said expanded crude carbon dioxide fluid is fed directly to said distillation column system.

41. A process according to any of #1 to #40, wherein said feed is derived from supercritical crude carbon dioxide liquid and carbon dioxide-enriched liquid is produced as a product.

42. A process according to #41, wherein said carbon dioxide-enriched liquid is removed from said distillation column system, pumped and warmed by indirect heat exchange to produce warmed carbon dioxide-enriched liquid as said product.

43. A process according to #42, wherein at least a portion of the duty required to warm said pumped carbon dioxide-enriched liquid is provided by indirect heat exchange against at least one of said recycle fluids.

44. A process according to #42 or #43, wherein said pumped carbon dioxide-enriched liquid is used as a "cold" process stream to provide refrigeration duty for the process.

45. A process according to any of #1 to #40, wherein said feed is derived from crude carbon dioxide vapor and carbon dioxide-enriched gas is produced as a product.

46. A process according to #45, wherein a portion of said carbon dioxide-enriched vapor is warmed by indirect heat exchange to produce said carbon dioxide-enriched gas.

47. A process according to #46, wherein at least a portion of the duty required to warm said carbon dioxide-enriched overhead vapor is provided by indirect heat exchange against at least one of said recycle fluids.

48. A process according to #46 or #47, wherein said carbon dioxide-enriched overhead vapor is used as a "cold" process stream to provide refrigeration duty for the process.

49. A process according to #1 to #48, wherein said further portion of bottoms liquid, or said liquid derived from bottoms liquid, is pumped and warmed by indirect heat exchange to provide impurity-rich waste liquid.

50. A process according to #49, wherein at least a portion of the duty required to warm said pumped bottoms liquid is provided by indirect heat exchange against at least one of said recycle fluids.

51. A process according to #49 or #50, wherein said further portion of said bottoms liquid, or said liquid derived from bottoms liquid, is used as a "cold" process stream to provide refrigeration duty for the process.

52. A process according to any of #1 to #51, wherein the operating pressure(s) said distillation column system is from about 10 bar to about 25 bar.

53. A process according to any of #1 to #52, wherein said at least one impurity is hydrogen sulfide ($H_2S$).

54. A process according to any of #1 to #53, wherein said process is auto-refrigerated.

55. A process for purifying crude carbon dioxide comprising at least one impurity that is less volatile than carbon dioxide, said process comprising:

feeding crude carbon dioxide feed at sub-ambient temperature to a distillation column system operating at super-atmospheric pressure(s) for separation to produce carbon dioxide-enriched overhead vapor and bottoms liquid enriched with said at least one impurity;

removing said carbon dioxide-enriched overhead vapor from said distillation column system and warming at least a portion of said carbon dioxide-enriched overhead vapor by indirect heat exchange to produce warmed carbon dioxide-enriched gas;

compressing a first working fluid comprising said warmed carbon dioxide-enriched gas to produce at least one compressed carbon dioxide-enriched gas;

cooling and at least partially condensing at least a portion of said compressed carbon dioxide-enriched gas as a first recycle fluid by indirect heat exchange to produce carbon dioxide-enriched fluid;

expanding said carbon dioxide-enriched fluid to produce expanded carbon dioxide-enriched fluid and feeding said expanded carbon dioxide-enriched fluid to said distillation column system, at least a portion of which being used as reflux;

compressing a second working fluid comprising carbon dioxide-rich gas from said distillation column system to produce at least one second recycle fluid;

cooling and optionally condensing at least a portion of said second recycle fluid by indirect heat exchange to produce cooled carbon dioxide-rich fluid;

after expansion as required, feeding at least a portion of said cooled carbon dioxide-rich fluid to said distillation column system;

at least partially re-boiling a portion of said bottoms liquid by indirect heat exchange to produce vapor for said distillation column system; and removing a further portion of said bottoms liquid, or a liquid derived from bottoms liquid, from said distillation column system, wherein re-boiling duty for said distillation column system is provided at least in part by indirect heat exchange against said first and second recycle fluids, said first recycle fluid having a different pressure from said second recycle fluid.

56. A process according to #55, wherein said compressed carbon dioxide-enriched gas is divided into at least a first portion and a second portion, wherein said first portion is said first recycle fluid(s), and wherein said second portion is said carbon dioxide-rich gas for compression to produce said second recycle fluid(s).

57. A process according to #55 or #56, wherein carbon dioxide-rich vapor is removed from an intermediate location in the distillation column system and warmed by indirect heat exchange to produce said carbon dioxide-rich gas for compression to produce said second recycle fluid(s).

58. A process according to any of #55 to #57, wherein liquid from an intermediate location in said distillation column system is at least partially re-boiled by indirect heat exchange to provide additional vapor for said distillation column system.

59. A process for purifying crude carbon dioxide comprising at least one impurity that is less volatile than carbon dioxide, said process comprising:

feeding crude carbon dioxide feed at sub-ambient temperature to a distillation column system operating at super-atmospheric pressure(s) for separation to produce carbon dioxide-enriched overhead vapor and bottoms liquid enriched with said at least one impurity;

condensing a portion of said carbon dioxide-enriched overhead vapor by indirect heat exchange to provide reflux for said distillation column system;

removing a further portion of said carbon dioxide-enriched overhead vapor from said distillation system;

removing carbon dioxide-rich liquid from an intermediate location in said distillation column system and expanding said liquid to produce expanded carbon dioxide-rich liquid;

warming and evaporating said expanded carbon dioxide-rich liquid by indirect heat exchange to provide warmed carbon dioxide-rich gas;

compressing a working fluid comprising said warmed carbon dioxide-rich gas to produce at least one compressed carbon dioxide-rich gas as a first recycle fluid and at least one further compressed carbon dioxide-rich gas as a second recycle fluid;

cooling and optionally at least partially condensing said first recycle fluid by indirect heat exchange to produce cooled first carbon dioxide-rich fluid;

combining said cooled first carbon dioxide-rich fluid with crude carbon dioxide fluid to produce said crude carbon dioxide feed for the distillation column system;

cooling and at least partially condensing said second recycle fluid by indirect heat exchange to produce cooled second carbon dioxide-rich fluid;

expanding said cooled second carbon dioxide-rich fluid to produce expanded carbon dioxide-rich fluid;

combining said expanded carbon dioxide-rich fluid with a fluid selected from the group consisting of said carbon dioxide-rich liquid, said expanded carbon dioxide-rich liquid, and said warmed carbon dioxide-rich gas;

at least partially re-boiling a portion of said bottoms liquid by indirect heat exchange against at least one "warm" process stream to produce vapor for said distillation column system; and removing a further portion of said bottoms liquid, or a liquid derived from bottoms liquid, from said distillation column system, wherein said re-boiling duty is provided at least in part by indirect heat exchange against said first and second recycle fluids and wherein, in embodiments in which said expanded carbon dioxide-rich fluid is combined with said warmed carbon dioxide-rich gas, said expanded carbon dioxide-rich fluid is first warmed and evaporated by indirect heat exchange to produce further warmed carbon dioxide-rich gas for said combination with said warmed carbon dioxide-rich gas.

60. Apparatus for carrying out a process according to #55, said apparatus comprising:

a distillation column system for operation at super-atmospheric pressure(s) for separating crude carbon dioxide feed at sub-ambient temperature to produce carbon-dioxide-enriched vapor and bottoms liquid enriched with said at least one impurity;

a first heat exchanger arrangement for warming at least a portion of said carbon dioxide-enriched overhead vapor by indirect heat exchange to produce warmed carbon dioxide-enriched gas;

a conduit arrangement for removing carbon dioxide-enriched overhead vapor from said distillation column system and feeding said vapor to said first heat exchanger arrangement;

a first compressor system for compressing said warmed carbon dioxide-enriched gas to produce at least one compressed carbon dioxide-enriched gas;

a second heat exchanger arrangement for cooling and at least partially condensing at least a portion of said compressed carbon dioxide-enriched gas as a first recycle fluid by indirect heat exchange to produce carbon dioxide-enriched fluid;

a first expansion device for expanding said carbon dioxide-enriched fluid to produce expanded carbon dioxide-enriched fluid for feeding to said distillation column system as reflux;

a second compressor system for compressing a carbon dioxide-rich gas from said distillation column system to produce at least one second recycle fluid;

a third heat exchanger arrangement for cooling and optionally condensing at least a portion of said second recycle fluid by indirect heat exchange to produce cooled carbon dioxide-rich fluid for feeding to said distillation column system;

an optional expansion device for expanding said cooled carbon dioxide-rich fluid to produce expanded carbon dioxide-rich fluid prior to being fed to said distillation column system;

a fourth heat exchanger arrangement for at least partially re-boiling said bottoms liquid by indirect heat exchange against at least one of said recycle streams to produce vapor for said distillation column system; and a conduit arrangement for removing a further portion of said bottoms liquid, or a liquid derived from bottoms liquid, from said distillation column system, wherein said first and second compression systems are capable of compressing said warmed carbon dioxide-enriched gas and said carbon dioxide-rich gas respectively to different pressures.

61. Apparatus according to #60 comprising a conduit arrangement for feeding compressed carbon dioxide enriched-gas from said first compressor system as feed to said second compressor system.

62. Apparatus according to #60 comprising:

a fifth heat exchanger arrangement for warming a carbon dioxide-rich vapor by indirect heat exchange to produce warmed carbon dioxide-rich gas;

a conduit arrangement for feeding carbon dioxide-rich vapor from an intermediate location in said distillation column system to said fifth heat exchanger arrangement; and a conduit arrangement for feeding warmed carbon dioxide-rich gas from said fifth heat exchanger arrangement to said second compressor system.

63. Apparatus according to any of #60 to #62, comprising a sixth heat exchanger arrangement for at least partially re-boiling liquid from an intermediate location in said distillation column system to provide additional vapor for said distillation column system.

64. Apparatus for carrying out a process according to #59, said apparatus comprising:

a distillation column system for operation at super-atmospheric pressure(s) for separating crude carbon dioxide feed at sub-ambient temperature to produce carbon-dioxide-enriched vapor and bottoms liquid enriched with said at least one impurity;

a first heat exchanger arrangement for cooling and partially condensing said carbon dioxide-enriched overhead vapor by indirect heat exchange to produce at least partially condensed carbon dioxide-enriched overhead vapor as reflux for said distillation column system;

a conduit arrangement for removing carbon dioxide-enriched overhead vapor from said distillation column system;

a first expansion device for expanding carbon dioxide-rich liquid to produce expanded carbon dioxide-rich liquid;

a conduit arrangement for feeding carbon dioxide-rich liquid from an intermediate location in said distillation column system to said first expansion device;

a second heat exchange arrangement for warming and evaporating said expanded carbon dioxide-rich liquid by indirect heat exchange to provide warmed carbon dioxide-rich gas;

a compressor system for compressing a working fluid comprising said combined carbon dioxide-rich gas to produce compressed carbon dioxide-rich gas as a first recycle fluid and at least one further compressed carbon dioxide-rich gas as a second recycle fluid;

a third heat exchange system for cooling and optionally at least partially condensing said first recycle fluid by indirect heat exchange to produce cooled first carbon dioxide-rich fluid;

a conduit arrangement for combining said cooled first carbon dioxide-rich fluid with crude carbon dioxide fluid to produce said crude carbon dioxide feed for the distillation column system;

a fourth heat exchange arrangement for cooling said second recycle fluid by indirect heat exchange to produce cooled second carbon dioxide-rich fluid;

a second expansion device for expanding said cooled second carbon dioxide-rich fluid to produce expanded carbon dioxide-rich fluid;

a conduit arrangement for combining said expanded carbon dioxide-rich fluid with a fluid selected from the group consisting of said carbon dioxide-rich liquid, said expanded carbon dioxide-rich liquid, and said warmed carbon dioxide-rich gas;

a fifth heat exchanger arrangement for at least partially re-boiling a portion of said bottoms liquid by indirect heat exchange against at least one of said recycle streams to produce vapor for said distillation column system; and a conduit arrangement for removing a further portion of said bottoms liquid, or a liquid derived from bottoms liquid, from said distillation column system, wherein, in embodiments in which said expanded carbon dioxide-rich fluid is combined with said warmed carbon dioxide-rich gas, said apparatus comprises sixth heat exchanger arrangement for warming expanded carbon dioxide-rich fluid by indirect heat exchange to produce further warmed carbon dioxide-rich gas for said combination with said warmed carbon dioxide-rich gas.

65. Apparatus according to any of #60 to #64, wherein said heat exchanger arrangements are passages within a single main heat exchanger.

Comparative Example 1

The flow sheet depicted in FIG. 1 was modeled by computer using Aspen Plus (version 7.2) software and the heat and mass balance data for key streams are provided in FIG. 16. The thermodynamic data used in the simulation is confidential and thus is not discussed herein. However, the data involves an estimate of the vapor-liquid equilibrium data based on published information, extrapolated into the composition and temperature/pressure range of interest. In the model, the purge stream 146 had zero flow and, while FIG. 16 indicates the presence of no $H_2S$ in the carbon dioxide product, there is actually about 5 ppm $H_2S$.

According to the modeling, the process of the comparative example consumes in total 17,054 kW of energy. This figure is the sum of the power required for compressors CP1 and CP2 (15,278 kW) and pumps P1 to P4 (1935 kW) less the power recovered by the feed expander E1 (160 kW).

Example 1

The flow sheet depicted in FIG. 2 was also modeled by computer using Aspen Plus (version 7.2) and the heat and mass balance data for key streams is provided in FIG. 17. The thermodynamic data used was the same as in Comparative Example 1. In the model, the purge stream had zero flow.

According to the modeling, this embodiment of the present invention consumes a total of 15,671 kW, indicating an overall power saving compared to the comparative example of 1,383 kW or about 8.1%. The bulk of this saving is achieved by the reduction in the power required to compress the carbon dioxide gas as working fluid for the heat pump cycle due to the reduction in flow of gas through the second compressor system CP2.

Example 2

The flow sheet depicted in FIG. 3 was also modeled by computer using Aspen Plus (version 7.2) and the heat and mass balance data for key streams is provided in FIG. 18. The thermodynamic data used was the same as in Comparative Example 1. In the model, the purge stream had zero flow.

According to the modeling, this embodiment of the present invention consumes a total of 9,933 kW, indicating an overall power saving compared to the comparative example of 7,121 kW or about 41.8%. The bulk of this saving is achieved by the reduction in the power required to compress the carbon dioxide gas as working fluid for the heat pump cycle due to the introduction of the intermediate re-boiler which reduces significantly the amount of overhead vapor that needs to be further compressed in the second compressor system, CP2.

Example 3

The flow sheet depicted in FIG. 8 was also modeled by computer using Aspen Plus (version 7.2) and the heat and mass balance data for key streams is provided in FIG. 19. The thermodynamic data used was the same as in Comparative Example 1. In the model, the purge stream had zero flow.

According to the modeling, this embodiment of the present invention consumes a total of 14,334 kW, indicating an overall power saving compared to the comparative example of 2,720 kW or about 15.9%. The additional power requirement for the carbon dioxide product compressor is more than off-set by the reduction in power arising from the modified heat pump cycle.

Comparative Example 2

In Comparative Example 2, the flow sheet depicted in FIG. 1 was re-modeled by computer using Aspen Plus (version 7.2) software using thermodynamic data based on experimentally measured vapor-liquid equilibrium data in the composition and pressure/temperature range of interest, and the revised heat and mass balance data for key streams is provided in FIG. 20. In the model, the purge stream 146 had zero flow.

The vapor-liquid equilibrium data are confidential and thus are not discussed herein. However, the data indicate that the separation is more difficult than estimated originally since the relative volatility of carbon dioxide and hydrogen sulfide is closer than expected to 1.

According to the modeling, the process of Comparative Example 2 consumes in total 24,835 kW of energy. This figure is the sum of the power required for compressors CP1 and CP2 (23,085 kW) and pumps P1 to P4 (1880 kW) less the power recovered by the feed expander E1 (130 kW).

Example 4

The flow sheet depicted in FIG. 14 was modeled by computer using Aspen Plus (version 7.2). The model used the same vapor-liquid equilibrium data as Comparative Example 2. The heat and mass balance data for key streams is provided in FIG. 21.

According to the modeling, this embodiment of the second aspect of the present invention consumes a total of 18,111 kW, indicating an overall power saving compared to Comparative Example 2 of 6,724 kW or about 27.1%. The bulk of this saving is achieved by the reduction in the power required to compress the carbon dioxide gas as working fluid for the heat pump cycle due to the reduction in the outlet pressure of the second compressor system CP2.

Example 5

The flow sheet depicted in FIG. 3 was also re-modeled by computer (Aspen Plus; ver. 7.2) using the same vapor-liquid equilibrium data as Comparative Example 2. In the model, the purge stream had zero flow. The heat and mass balance data for key streams is provided in FIG. 22.

According to the modeling, this embodiment of the present invention consumes a total of 15,950 kW, indicating an overall power saving compared to Comparative Example 2 of 8885 kW or about 35.8%. The bulk of this saving is achieved by the reduction in the power required to compress the carbon dioxide gas as working fluid for the heat pump cycle due to the reduction in flow of gas through the compressor system and reduction in pressure of the lower pressure recycle stream 120 compared to the single recycle pressure stream 130 in Comparative Example 2.

The total power consumed in Example 4 (18,111 kW) is greater than the total power consumed in Example 5 (15,950 kW). However, the inventors realize that, in some circumstances, the value of the reduced capital of a single compressor system will be greater than the cost of the additional power consumed over the plant lifetime. On this basis, there would still be an advantage in some circumstances of arrangements involving a single heat pump cycle over arrangements involving heat pump cycles having two or more recycle streams at different pressures.

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A process for purifying crude carbon dioxide comprising at least one impurity that is less volatile than carbon dioxide, said process comprising:
   feeding crude carbon dioxide to a distillation column system operating at super-atmospheric pressure(s) for separation to produce carbon dioxide-enriched overhead vapor and bottoms liquid enriched with said at least one impurity;
   providing carbon dioxide-enriched liquid as reflux for said distillation column system;
   re-boiling said distillation column system by at least partially vaporizing said impurity-enriched bottoms liquid and at least one intermediate liquid in or taken from an intermediate location in said distillation column system by indirect heat exchange to provide vapor for said distillation column system;
   removing said carbon dioxide-enriched overhead vapor from said distillation column system; and
   removing said impurity-enriched bottoms liquid, or a liquid derived from said impurity-enriched bottoms liquid, from said distillation column system,
   wherein said process comprises a heat pump cycle using as working fluid said carbon dioxide-enriched overhead vapor from said distillation column system, said heat pump cycle comprising:
   (a) warming said carbon dioxide-enriched overhead vapor by indirect heat exchange to produce warmed carbon dioxide-enriched gas;
   (b) compressing said warmed carbon dioxide-enriched gas to produce compressed carbon dioxide-enriched recycle gas;
   (c) using said compressed carbon dioxide-enriched recycle gas to provide at least a part of the reboil duty required to vaporize said impurity-enriched bottoms liquid thereby cooling said compressed carbon dioxide-enriched recycle gas;
   (d) using said compressed carbon dioxide-enriched recycle gas to provide at least a part of the reboil duty required to vaporize said intermediate liquid(s) thereby cooling and at least partially condensing said compressed carbon dioxide-enriched recycle gas to produce carbon dioxide-enriched liquid;
   (e) expanding said carbon dioxide-enriched liquid to produce expanded carbon dioxide-enriched liquid; and
   (f) using at least a portion of said expanded carbon dioxide-enriched liquid to provide said reflux to said distillation column system;
   wherein the compressed carbon dioxide-enriched recycle gas is at substantially the same pressure in steps (c) and (d).

2. The process of claim 1, wherein the, or at least one of the intermediate liquids, is enriched in the said at least one less volatile impurity.

3. The process of claim 1, wherein said compressed carbon dioxide-containing recycle gas is at a pressure from 15 bar to 60 bar.

4. The process of claim 1, wherein a portion of said working fluid is purged from said process.

5. The process of claim 1, wherein said crude carbon dioxide is crude carbon dioxide fluid derived from a natural source of carbon dioxide and expanded prior to feeding to said distillation column system.

6. The process of claim 5, wherein, prior to said expansion, said crude carbon dioxide fluid is at a super-critical pressure and a sub-critical temperature.

7. The process of claim 5, wherein said crude carbon dioxide fluid is cooled by indirect heat exchange prior to expansion.

8. The process of claim 7, wherein at least a portion of the duty required to cool said crude carbon dioxide fluid is provided by indirect heat exchange against at least one "cold" process stream.

9. The process of claim 5, wherein said expanded crude carbon dioxide is used as a "cold" process stream to provide refrigeration duty for said process.

10. The process of claim 1, wherein said crude carbon dioxide is derived from supercritical crude carbon dioxide fluid and carbon dioxide-enriched liquid is produced as a product.

11. The process of claim 10, wherein said carbon dioxide-enriched liquid is removed from said distillation column system, pumped and warmed by indirect heat exchange to produce warmed carbon dioxide-enriched liquid as said product.

12. The process of claim 11, wherein at least a portion of the duty required to warm said pumped carbon dioxide-enriched liquid is provided by indirect heat exchange against at least a portion of said working fluid from said heat pump cycle, after said portion of said working fluid has been compressed.

13. The process of claim 11, wherein said pumped carbon dioxide-enriched liquid is used as a "cold" process stream to provide refrigeration duty for the process.

14. The process of claim 1, wherein said impurity-enriched bottoms liquid, or said liquid derived from impurity-enriched bottoms liquid, is pumped and warmed by indirect heat exchange to provide impurity-rich waste liquid.

15. The process of claim 14, wherein at least a portion of the duty required to warm said pumped impurity-enriched bottoms liquid is provided by indirect heat exchange against at least a portion of said working fluid from said heat pump cycle, after said portion of said working fluid has been compressed.

16. The process of claim 14, wherein said impurity-enriched bottoms liquid, or said liquid derived from impurity-enriched bottoms liquid, is used as a "cold" process stream to provide refrigeration duty for the process.

17. The process of claim 1, wherein the operating pressure(s) said distillation column system is from 10 bar to 25 bar.

18. The process of claim 1, wherein said at least one impurity is hydrogen sulfide (H2S).

19. The process of claim 1, wherein said process is auto-refrigerated.

20. The process of claim 1, wherein a bulk of boil-up duty for said distillation column system is provided by said at least partial vaporization of said at least one intermediate liquid.

21. The process of claim 1 wherein the compressed carbon dioxide-enriched recycle gas is cooled but not condensed in step (c).

* * * * *